United States Patent
Shatzkamer et al.

(10) Patent No.: US 9,414,215 B2
(45) Date of Patent: Aug. 9, 2016

(54) SYSTEM AND METHOD FOR ORCHESTRATING MOBILE DATA NETWORKS IN A MACHINE-TO-MACHINE ENVIRONMENT

(71) Applicant: CISCO TECHNOLOGY, INC., San Jose, CA (US)

(72) Inventors: Kevin D. Shatzkamer, Hingham, MA (US); Stefan Bernard Raab, South Riding, VA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 157 days.

(21) Appl. No.: 14/046,684

(22) Filed: Oct. 4, 2013

(65) Prior Publication Data
US 2015/0289123 A1    Oct. 8, 2015

(51) Int. Cl.
H04M 11/00 (2006.01)
H04W 4/26 (2009.01)
G06Q 10/06 (2012.01)

(52) U.S. Cl.
CPC ........ *H04W 4/26* (2013.01); *G06Q 10/06* (2013.01)

(58) Field of Classification Search
USPC .................... 709/223–224, 226, 228, 229; 715/736–739; 455/418–419, 445
See application file for complete search history.

(56) References Cited

U.S. PATENT DOCUMENTS

| | | | |
|---|---|---|---|
| 6,128,279 A | 10/2000 | O'Neil et al. | |
| 8,249,361 B1 | 8/2012 | Steffens | |
| 2003/0236087 A1 * | 12/2003 | Stenton | 455/418 |
| 2004/0001498 A1 | 1/2004 | Chen et al. | |
| 2004/0156495 A1 | 8/2004 | Chava | |
| 2004/0172559 A1 | 9/2004 | Luo | |
| 2004/0193582 A1 | 9/2004 | Smyth | |
| 2004/0205767 A1 | 10/2004 | Partanen | |
| 2004/0221038 A1 | 11/2004 | Clarke et al. | |
| 2005/0228878 A1 | 10/2005 | Anstey et al. | |
| 2007/0036145 A1 | 2/2007 | Riley et al. | |
| 2007/0250630 A1 | 10/2007 | Blanding et al. | |
| 2008/0222646 A1 | 9/2008 | Sigal et al. | |
| 2010/0027663 A1 | 2/2010 | Dai | |

(Continued)

FOREIGN PATENT DOCUMENTS

| | | |
|---|---|---|
| CN | 104053142 A | 9/2014 |
| CN | 104284324 A | 1/2015 |

(Continued)

OTHER PUBLICATIONS

USPTO Dec. 12, 2014 Non-Final Office Action from U.S. Appl. No. 13/750,835.

(Continued)

*Primary Examiner* — Dai A Phuong
(74) *Attorney, Agent, or Firm* — Patent Capital Group

(57) ABSTRACT

A method is provided in one example and includes receiving network utilization data associated with an access network, determining an expected network utilization for a predetermined time period based upon the network utilization data, and determining pricing information for the predetermined time period based upon the expected network utilization. The pricing information includes at least one price rate for communication between at least one application and at least one client device utilizing the access network. The method further includes sending the pricing information to the at least one application.

30 Claims, 11 Drawing Sheets

(56) References Cited

U.S. PATENT DOCUMENTS

| | | |
|---|---|---|
| 2010/0036956 A1 | 2/2010 | Nishikawa |
| 2010/0153454 A1 | 6/2010 | Rehm et al. |
| 2010/0205436 A1* | 8/2010 | Pezeshki ............ H04L 67/04 713/168 |
| 2011/0158090 A1 | 6/2011 | Riley et al. |
| 2011/0258246 A1 | 10/2011 | Khandekar et al. |
| 2012/0052866 A1 | 3/2012 | Froehlich et al. |
| 2012/0054755 A1 | 3/2012 | Evans |
| 2012/0110145 A1 | 5/2012 | Pinheiro |
| 2012/0110462 A1* | 5/2012 | Eswaran ............ G06F 9/5072 715/736 |
| 2012/0155389 A1 | 6/2012 | McNamee |
| 2012/0239792 A1 | 9/2012 | Banerjee et al. |
| 2012/0281540 A1 | 11/2012 | Khan |
| 2012/0303425 A1 | 11/2012 | Katzin et al. |
| 2013/0035060 A1* | 2/2013 | Chan ............ H04L 12/145 455/406 |
| 2013/0189982 A1* | 7/2013 | Baluja ............ G06Q 30/0601 455/435.3 |
| 2013/0295921 A1* | 11/2013 | Bhargava ............ H04W 72/085 455/426.1 |
| 2014/0067728 A1 | 3/2014 | Ogren |
| 2014/0113628 A1* | 4/2014 | Sundararajan ........ H04W 48/18 455/435.2 |
| 2014/0171135 A1* | 6/2014 | Fan ............ H04W 4/14 455/466 |
| 2014/0201381 A1 | 7/2014 | Shimizu |
| 2014/0204746 A1 | 7/2014 | Sun et al. |
| 2014/0214914 A1 | 7/2014 | Alex et al. |
| 2014/0280830 A1 | 9/2014 | Ang et al. |
| 2014/0323084 A1* | 10/2014 | Menezes ............ H04W 4/26 455/406 |
| 2014/0342691 A1* | 11/2014 | Kalavade ............ G06Q 10/0637 455/405 |
| 2014/0370847 A1* | 12/2014 | Neal ............ H04M 15/61 455/406 |
| 2015/0006733 A1* | 1/2015 | Khan ............ H04L 47/70 709/226 |
| 2015/0019746 A1 | 1/2015 | Shatzkamer et al. |
| 2015/0278296 A1 | 10/2015 | Alex et al. |
| 2015/0289167 A1 | 10/2015 | Alex et al. |
| 2015/0312152 A1* | 10/2015 | Kerr ............ G06Q 10/04 370/254 |
| 2015/0373554 A1* | 12/2015 | Freda ............ H04W 16/14 455/450 |
| 2016/0044512 A1* | 2/2016 | Potkonjak ........ H04M 1/72569 455/411 |

FOREIGN PATENT DOCUMENTS

| | | |
|---|---|---|
| EP | 2299647 A2 | 3/2011 |
| EP | 2299675 A1 | 3/2011 |
| EP | 2768181 | 8/2014 |
| EP | 2822247 | 1/2015 |
| EP | 2858016 | 4/2015 |
| EP | 2858020 | 4/2015 |
| WO | WO2012/000161 | 1/2012 |
| WO | WO2013/007287 | 1/2013 |

OTHER PUBLICATIONS

EPO—Sep. 29, 2014 Extended Search Report and Opinion from European Application Serial No. 14166461.5.

EPO Jul. 21, 2014 Extended Search Report and Opinion from European Application Serial No. 14151385.

Kunz, Thomas, "The Influence of Different Workload Descriptions on a Heuristic Load Balancing Scheme," IEEE Transactions on Software Engineering, vol. 17, No. 7, Jul. 1991.

EPO Feb. 12, 2015 Extended Search Report and Opinion from European Application Serial No. 1485787.

"GSM 03-08 Version 5.1.0: Digital Cellular Telecommunication System (Phase 2+) Organization of Subscriber Data," ETSI European Telecommunications Standard Institute, Sophia Antipolis, Valbonne France; Apr. 1997; 22 pages.

EPO Feb. 23, 2015 Extended Search Report and Opinion from European Application Serial No. 14183238.6.

China Mobile, et al., "Policy Control Based on Network Condition," SA WG2 Temporary Document TD S2-105228, 3GPP TSG SA WG2 Meeting #81, Oct. 11-15, 2010, Prague, Czech Republic, XP-002658059; 4 pages.

NTT Docomo, "C-Plane/PCC based Congestion Notification," SA WG2 Temporary Document S2-130872, SA WG2 Meeting #96, Apr. 8-12, 2013, San Diego, US; 5 pages.

ATIS, "Network Optimization Focus Group (NetOp-FG) Assessment and Recommendations," Alliance for Telecommunications Industry Solutions, Sep. 2011; 61 pages.

USPTO Jun. 9, 2015 Non-Final Office Action from U.S. Appl. No. 13/750,835.

USPTO Jun. 4, 2015 Non-Final Office Action from U.S. Appl. No. 13/935,994.

USPTO Oct. 2, 2015 Non-Final Office Action from U.S. Appl. No. 13/750,835.

USPTO Oct. 30, 2015 Notice of Allowance from U.S. Appl. No. 13/935,994.

USPTO Oct. 19, 2015 Final Office Action from U.S. Appl. No. 14/044,390.

Fajardo, V., et al., "Diameter Base Protocol," RFC 6733, Oct. 2012, Internet Engineering Task Force.

\* cited by examiner

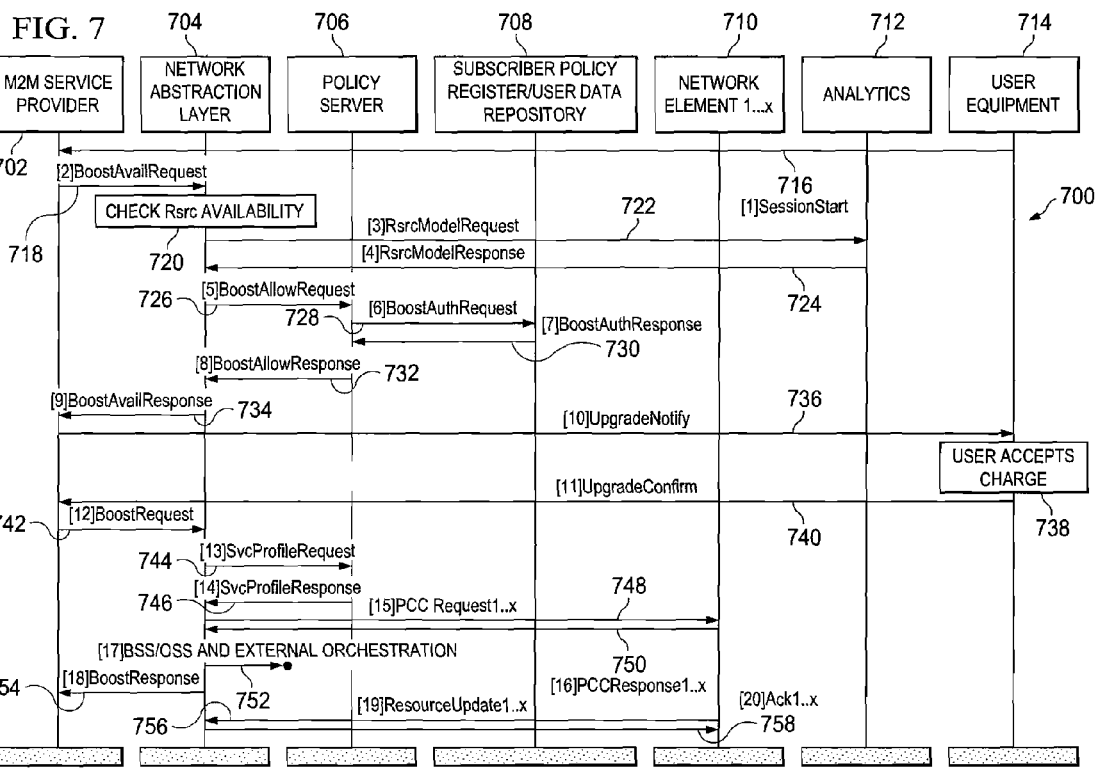

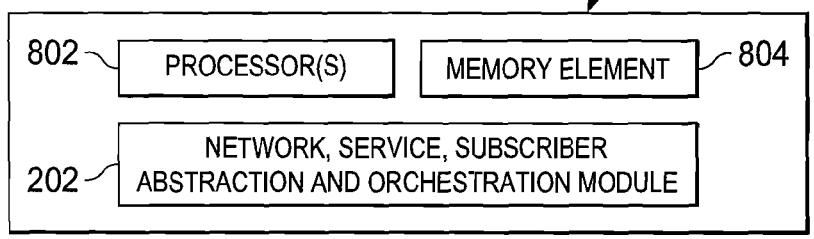
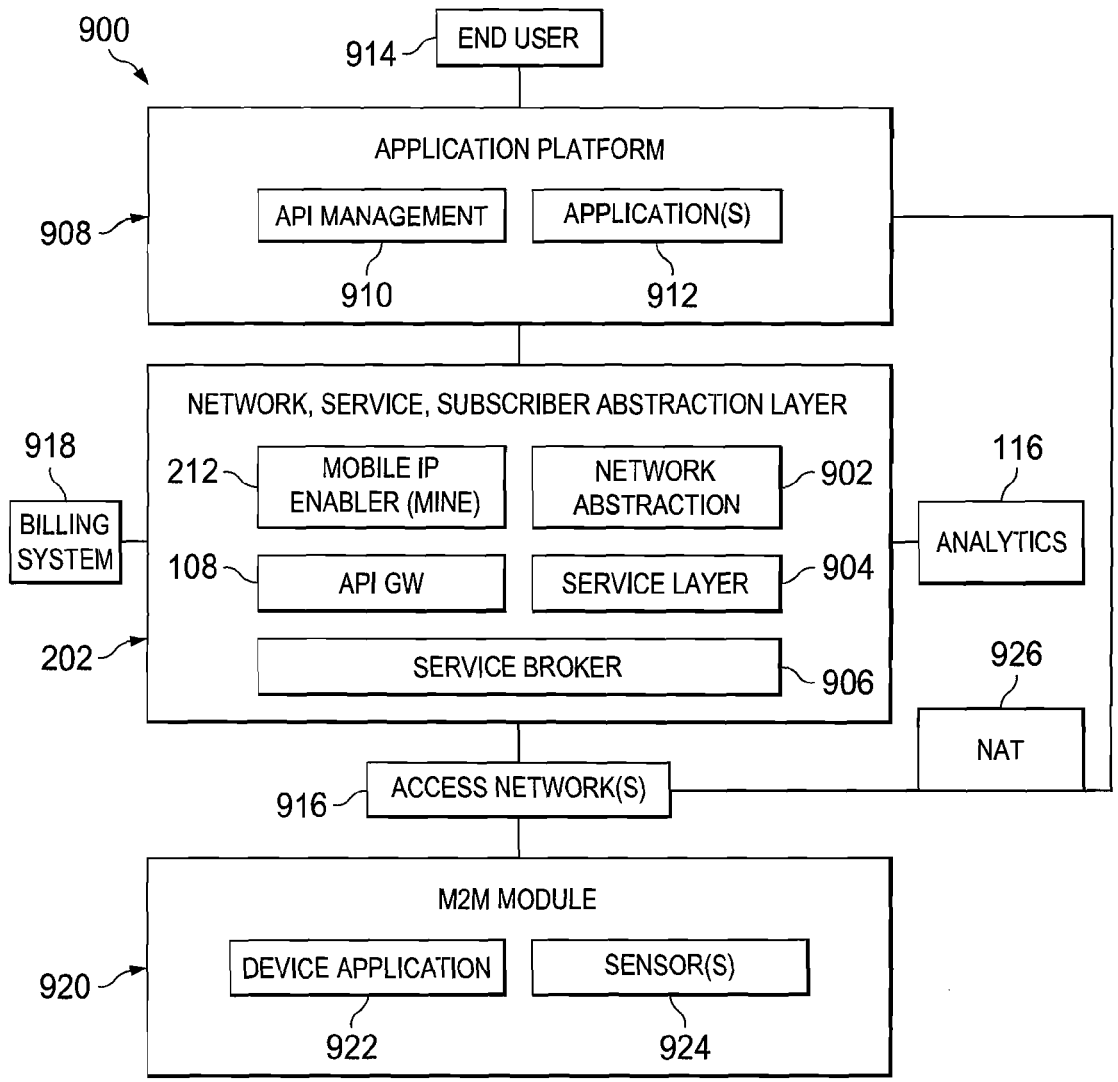

SYSTEM AND METHOD FOR ORCHESTRATING MOBILE DATA NETWORKS IN A MACHINE-TO-MACHINE ENVIRONMENT

TECHNICAL FIELD

This disclosure relates in general to the field of communications and, more particularly, to providing a system and method for orchestrating mobile data networks in a machine-to-machine (M2M) environment.

BACKGROUND

The phenomenal growth of mobile networking is presenting mobile operators with tremendous opportunities along with corresponding challenges as they race to add capacity and services to meet accelerating demands. Mobile operators worldwide are seeing tremendous growth in mobile data subscriptions and bandwidth usage. The emergence of free, "over-the-top" and offnet applications and services (such as those from Skype, gaming vendors, and applications stores is impacting the return on investment (ROI) of mobile operators. Consumers can utilize these applications and services, which use the operator's network, without providing even an incremental usage fee to the mobile operator. While operators benefit in the near term with new subscriptions, long term there are profitability challenges from the explosion of data traffic. To take advantage of the mobile Internet explosion, mobile operators must add value to third party service transactions. This value can be extracted in terms of new revenue and profit. Without this value add, mobile operators risk becoming simply a bandwidth "bit pipe" provider. As a result, it is critical for mobile operators to invest strategically in their network assets allowing them to launch new services and go beyond flat-rate data plans. In current networks, various pieces of information like location of a subscriber and the reachability of a subscriber etc distributed in various network elements throughout the network and there is no single entity in the network that can aggregate the information present in the different network elements, correlate the information, and feed that information to various external entities.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 7 is a simplified diagram of an embodiment of a call flow of a network, service, subscriber abstraction, orchestration module;

FIG. 8 is a simplified block diagram illustrating a particular embodiment of a server of the communication system of FIG. 2;

FIG. 9 is a simplified block diagram of an embodiment of a communication system for orchestrating mobile data networks in a machine-to-machine (M2M) environment;

DETAILED DESCRIPTION OF EXAMPLE EMBODIMENTS

Overview

A method is provided in one example and includes receiving network utilization data associated with an access network, determining an expected network utilization for a predetermined time period based upon the network utilization data, and determining pricing information for the predetermined time period based upon the expected network utilization. The pricing information includes at least one price rate for communication between at least one application and at least one client device utilizing the access network. The method further includes sending the pricing information to the at least one application.

In a particular embodiment, the method further includes sending a request including the network utilization data to an analytics component, and receiving a response including analyzed network utilization data from the analytics component. In still another particular embodiment, the determining of the expected network utilization is based upon real-time and historical analyzed network utilization data.

In another particular embodiment, the method further includes receiving location data associated with a location of the client device within the access network, wherein the determining of the expected network utilization is further based upon the location data. In still another particular embodiment, the method further includes receiving a subscription request from the at least one application for pricing information associated with utilization of the access network. In still another particular embodiment, the method further includes sending the pricing information to a billing system.

In another particular embodiment, at least one application is configured to determine whether the pricing information meets pricing requirements of at least one application, send a request for sensor data to the client device during the predetermined time period when the pricing information meets the pricing requirements, and receive a response including the sensor data from client device utilizing the access network during the predetermined time period. In still another particular embodiment, the pricing information includes different price rates associated with different service classes.

In a particular embodiment, the client device includes a machine-to-machine module. In a particular embodiment, the method further includes correlating an access network identifier associated with the client device to an external identifier associated with the client device. In still another particular embodiment, the external identifier is used to identify client device by an application platform associated with the at least one application, and the access network identifier is used to identify the client device within the access network.

Example Embodiments

Figure 1:
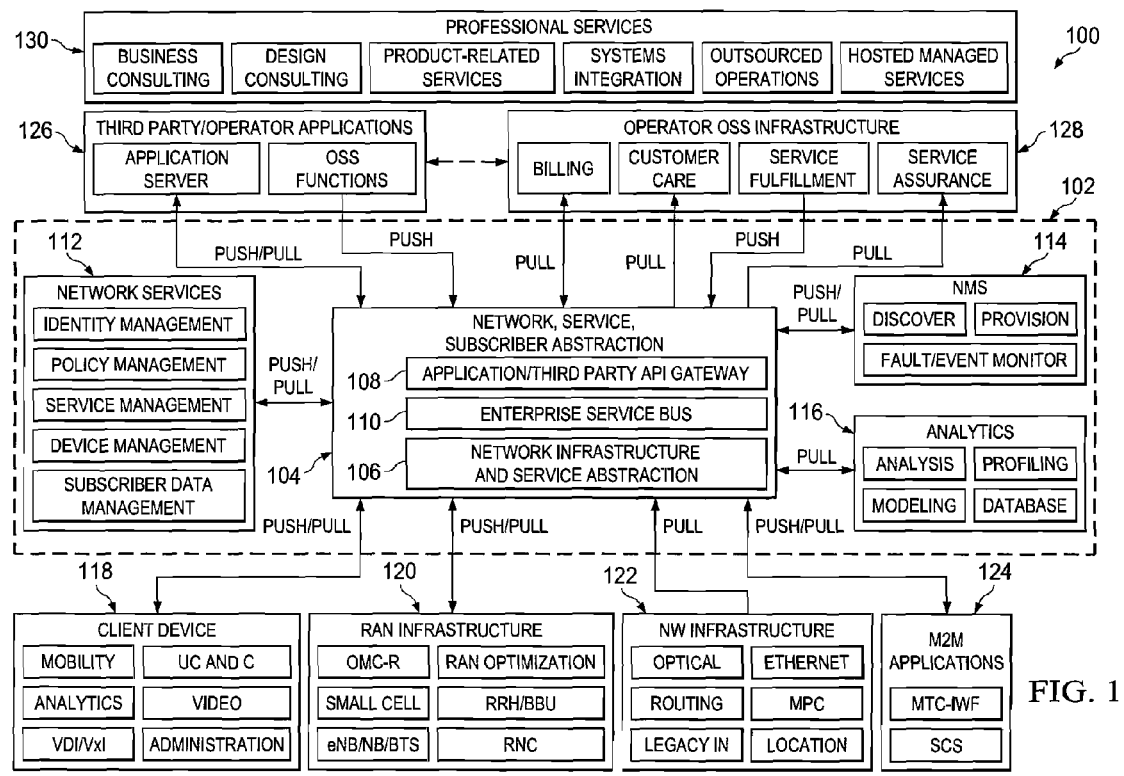
FIG. 1 is a simplified block diagram showing a high level architecture of a communication system for orchestrating mobile networks in accordance with one embodiment of the present disclosure.

Referring now to FIG. 1, FIG. 1 is a simplified block diagram showing a high-level architecture of a communication system 100 for orchestrating mobile networks in accordance with one embodiment of the present disclosure. Communication system 100 includes a server 102 including a network, service, and subscriber abstraction module 104. The network, service, and subscriber abstraction module 104 includes a network infrastructure and service abstraction layer 106, an application/3rd party application programming interface (API) gateway 108, and enterprise service BUS 110. Server 102 further includes a network services layer 112, a network management system (NMS) 114, and analytics module 116.

Communication system 100 provides for monetization architecture for mobile networks. Issues facing service providers today includes creating services targeted for both the enterprise and consumer markets in a rapid fashion, dynamically optimizing the network to drive efficiencies, enabling a third party application developer eco-system to easily leverage the power of the network, and providing enforceability of service level agreements between the network and the application developer. One or more embodiments of the architecture described herein address these issues. Various embodiments allow a mobile service provider, fixed line provider and/or large enterprise to create a platform which exposes network capabilities and allows application developers and walled gardened applications developers to leverage the power of the network, allowing service providers to monetize the capabilities of the network by optimizing the infrastructure, creating a service framework that allows service providers to quickly and efficiently create new service offers, and defining a set of criteria, including Quality of Service, which may be monitored, enforced, and relied-upon. Various embodiments provide an architecture to integrate with the existing capabilities that the service provider provides while avoiding "rip and replace" scenarios and ensuring faster time to market.

Network services layer 112 provides for the management of network services within communication system 100. In a particular embodiment, network services layer 112 may provide one or more of identity management, service management, policy management, device management, and subscriber data management. Identity management enables a service provider to manage subscribers across all applications, device types, and access types. In a mobile context, the Identity management functions may reside within one or more of a home location register (HLR), home subscriber server (HSS), and authentication, authorization, and accounting (AAA) server. Service management enables a service provider to manage services/application charging/rating functions across all access types, device types, and subscribers. In mobile a mobile context, the service management functions may reside in one or more of an online charging system (OCS) and an offline charging system (OFCS). Device management enables a service provider to manage device behavior when interacting with different access and applications. In a mobile context, the device management functions may reside in a Open Mobile Alliance device management (OMA-DM) function and Access network discovery and selection function (ANDSF), but may in other embodiments also extend into operator-specific implementations that allow modification of device parameters, security parameters, application interaction, etc.

Policy management enables a service provider to define rules based on various input parameters from identity/service/device management functions, network functions, analytics functions, coupled with internally-defined rules (e.g., time-of-day, promotional), to determine how a specific service for a specific subscriber, on a specific device, at a specific instant (e.g., real-time), at a specific location (e.g., cell tower), when connected to a specific network is to be treated. In a mobile context, the policy management functions may reside live in a policy and charging rules function (PCRF). Subscriber data management enables a service provider to deliver real-time services that reflect individual preferences of subscriber. Subscriber data management may encompass the overarching service layer management workflow items and underlying an service layer management database that allow for multiple structured or unstructured pieces of information to be stored and aggregated into a holistic "user profile". The subscriber data that is managed may include identity information, authentication information, personalization information, policy settings, and settings for specific services. In a particular embodiment, the subscriber data management includes a Subscriber Profile Repository (SPR).

NMS 114 manages the network elements, also called managed devices, within communication system 100. In a particular embodiment, NMS 114 may include discovery, fault/event monitoring, and provisioning of network elements. Device management may include fault, configuration, accounting, performance, and security management. Management tasks include discovering network inventory, monitoring device health and status, providing alerts to conditions that impact system performance, and identification of problems, their source(s) and possible solutions. NMS 114 may further collect device statistics and may maintain an archive of previous network statistics including problems and solutions that were successful in the past. If faults recur, NMS 114 may search the archive for the possible solutions. Analytics module 116 analyzes network traffic received by server 104 in real-time and provides for a view of network use within communication system 100. Analytics module 116 may include analysis, profiling, modeling, and database functions.

In accordance with one or more embodiments, network, service, and subscriber abstraction module 104 is configured to either collection information or data, or facilitate other functions from collecting information or data from various network elements within communication system 100. In the case of collection, network, service, and subscriber abstraction module 104 is configured to abstract the data by examining one or more correlating factors between collected data such as an Internet Protocol (IP) address or mobile subscriber identifier, combine the correlating data together based upon the correlating factors into a consistent store of data which can be later accessed and utilized. As a result, network, service, and subscriber abstraction module 104 creates structured data from unstructured data. Network, service, and subscriber abstraction module 104 is configured in at least one embodiment to collect data from one or more of network services layer 112, NMS 114, and analytics module 116 for abstraction and storage. The abstraction function provides a stateless communications plane for service aggregation and protocol conversion. The abstraction function is stateless but in various embodiments, the database is not stateless. In one or more embodiments, the collection of data may be an active-pull in which network, service, and subscriber abstraction module 104 is pulling information from a particular network element. In other embodiments, the collection of data may be an active-push in which a network element is pushing specific information to network, service, and subscriber abstraction module 104 on configured thresholds or time windows. In still other embodiments, network, service, and subscriber abstraction module 104 may collect the data in a passive manner as the data passes through it. The abstraction layer includes a mobile IP network enabler that provides a service aggregator function. The aggregation function provides for collection and coordination of real-time network, subscriber, application intelligence (such as packet core, probes, and other elements) for service enablement. An API gateway provides a protocol translation function, securely enabling deeper integration with third parties. OSS integration provides billing and settlement integration into existing OSS, as well as 3rd party Service Brokers to provide orchestration workflows.

Server 102 is in communication with a client device 118, a radio access network infrastructure 120, network infrastructure 122, and M2M applications 124 through network infrastructure and service abstraction layer 106. In a particular embodiment, client device 118 may include any mobile client device such as a mobile telephone, a smartphone, or a tablet. In a particular embodiment, client device 118 may include mobility, analytics, virtual desktop infrastructure (VDI)/virtual experience infrastructure (VXI), unified communications and collaboration (UC&C), video, and administration functions. RAN infrastructure 120 include hardware and software configured to implement radio access network functions and may include operations maintenance center radio (OMC-R), small cell, eNB/NB/BTS, RAN optimization, RRH/BBU, and radio network controller (RNC) functions. Network infrastructure 122 includes hardware and software configured to implement wired network infrastructure functions and may include optical, routing, legacy IN, Ethernet, MPC, and location functions. M2M applications 124 are configured to provide M2M application functions to fixed or mobile subscribers. In particular embodiments, the M2M functions may include a Machine-Type Communications Interworking Function (MTC-IWF) and a Service Capabilities Server (SCS).

Network, service, and subscriber abstraction module 104 is further configured in at least one embodiment to collect data from one or more of client device 118, RAN infrastructure 120, network infrastructure 122, and integrated M2M applications 124 for abstraction, interworking and storage.

Server 102 is further in communication with enterprise applications 126 via application/3rd party API gateway 108, and operator OSS infrastructure 128 via enterprise service bus 110. Enterprise applications 126 provide third party services and operations support systems (OSS) services to subscribers in the network. In particular embodiments, enterprise applications 126 may include an application server and OSS functions. In one or more embodiments, enterprise applications 126 may provide enterprise applications to communication network 100. In particular embodiments, enterprise applications may include collaboration, video communications, and email services hosted either within or without the enterprise systems. Operator OSS infrastructure 128 supports processes such as maintaining network inventory, provisioning services, configuring network components, managing faults, taking orders, processing bills, and collecting payments. In a particular embodiment, operator OSS infrastructure 128 may include billing, customer care, service fulfillment, and service assurance components. The enterprise OSS may include customer care, enterprise service/application fulfillment, employee asset tracking, information security rules, and other enterprise functions. The billing component may include retail billing which enables operators to generate a customer bill based on service plan, usage, promotions, and other OSS interactions, and enabling third parties to leverage operator billing systems for charging a subscriber such as for an in-app purchase that appears on the customer's bill, allowing third party Wi-Fi providers to bill the subscriber, or service delivery platform interaction (e.g., ringtone download). The billing component may also differentiate enterprise data usage (that is relevant to work tasks) from consumer data usage (that is relevant to personal tasks) from the same device with the same subscriber identity. The billing component may also enable an analytical based approach to understanding subscriber billing trends as a means of providing information to an operator that might facilitate service creation, campaign creation, pricing, etc. This may be for a prepaid user or an enterprise shared data plan user, in which case the billing system also manages quota/balance in real-time, converged (across multiple access types) and postpaid.

The customer care component may include customer interaction systems to provide channels for customer self-service, enterprise IT self-service and direct machine-to-customer information, customer relationship management to provide sophisticated marketing, sales and operational support to the service provider agents who interact with the customer, and subscriber management software to support care agents and direct customer interaction. The service fulfillment component may include systems to provide order management systems to orchestrate the steps needed to implement customer orders, handle interdependencies, requests to other content service providers (CSPs), cloud service providers and enterprise platform-as-a-service (PaaS), and manual work orders. The service fulfillment component may further include inventory management systems to track the inventory available to supply services in the network, assign resources, design network connections, and discover network configurations and reconcile them with inventory records. The service fulfillment component may further provide for activation to automatically configure network equipment and network-serving systems to provide a subscriber-requested service, and engineering tools refers to support engineers who plan, design, install and configure networks and services, including planning and design tools, outside plant and geographical information systems, and network installation and configuration tools.

The service assurance component may include service management systems to link customers with their individual services, and enable CSPs to generate granular reports on each customer and service to validate service-level commitments. The service assurance component may further include performance-monitoring systems to collect circuit-switched and packet data from the network elements and element management systems supplied by equipment manufacturers and provide reports for operations staff. The service assurance component may further include workforce automation software used to track incidents resulting from service disruption and effectively dispatch field resources, and probe systems rely on dedicated hardware and software agents to collect signaling and media data from the network. In at least one embodiment, the various components of communication system 100 may interoperate to provide professional services 130 including business consulting, design consulting, product-related services, system integration, outsourced operations and hosted management services.

In various embodiments, network, server, and subscriber abstraction module 104 is configured to provide the abstracted information obtained from data sources within communication system 100, such as client device 118, to an information consumer, such as one or more of enterprise applications 126 and operator OSS infrastructure 128, which uses the information to provide some value-added service to subscribers in the network as will be further described herein. In one or more embodiments, the structured/correlated database is what allows "northbound" systems such as enterprise applications 126 and operator OSS infrastructure 128 to function more effectively.

In the particular embodiment illustrated in FIG. 1, network services layer 112, NMS 114, client device 118, RAN infrastructure 120, M2M applications 124, the application server of enterprise applications 126 have push/pull data connections with network, service, and subscriber abstraction module 104. Further, in the particular embodiment illustrated in FIG. 1, analytics module 116, network infrastructure 122, the OSS functions of enterprise applications 126, and the component of operator OSS infrastructure 128 have a pull connection with network, service, and subscriber abstraction module 104. In still other embodiments, the one or more components may have push connections, pull connections, or both push and pull connections with any other component.

The phenomenal growth of mobile networking is presenting mobile operators with tremendous opportunities along with corresponding challenges as they race to add capacity and services to meet accelerating demands. Mobile operators worldwide are seeing tremendous growth in mobile data subscriptions and bandwidth usage. The emergence of "over-the-top" and offnet applications and services (such as those from salesforce.com, Skype, gaming vendors, and applications stores is impacting the return on investment (ROI) of mobile operators. Consumers can utilize these applications and services, which use the operator's network, without providing even an incremental usage fee to the mobile operator. While operators benefit in the near term with new subscriptions, long term there are profitability challenges from the explosion of data traffic. To take advantage of the mobile Internet explosion, mobile operators must add value to third party service transactions. This value can be extracted in terms of new revenue and profit. Without this value add, mobile operators risk becoming simply a bandwidth "bit pipe" provider. As a result, it is critical for mobile operators to invest strategically in their network assets allowing them to launch new services and go beyond flat-rate data plans. In current networks, various pieces of information like location of a subscriber and the reachability of a subscriber etc distributed in various network elements throughout the network and there is no single entity in the network that can aggregate the information present in the different network elements, correlate the information, and feed that information to various external entities.

The current challenges for creating new services may include: Long time to availability—typically twelve to eighteen months to enable services; service silos—building one service doesn't always help build the second service; personalization—each service has unique requirements; no killer application—market conditions vary between operators and regions; and lag in response times—it is difficult to quickly create or modify services in response to market trends. In the case of Machine to Machine (M2M), operator margins and service cost points are much lower than consumer, driving a requirement for even more efficient service and network infrastructure. While operators have significant challenges, they also have significant market advantages and unique value. For example, application developers are often clamoring to leverage information only available in the network. Application provider challenges include: restricted or no access to the network; limited visibility into accurate location information in high volume, no real time access; lack of desire to understand or communicate with the complex operator topology; difficulty in correlating multiple sources/vendors; and lack of standard interfaces to carrier applications/services.

Mobile operators have the opportunity to leverage the key asset in their networks—real-time subscriber, application, and network intelligence—and build an architecture that harvests this intelligence to monetize the network. Various embodiments described herein provide a monetization architecture that increases service velocity, quickly enabling multiple use cases, while providing a platform for application developers to leverage the network. This may provide increased revenue for both the operator and application developers, while enhancing the subscriber experience.

At least one embodiment solves the problem of abstracting out data from different sources and organizing the data into a coherent format that can be translated into one or more external protocols such as Hypertext Transfer Protocol (HTTP), Extensible Messaging and Presence Protocol (XMPP), Constrained Application Protocol (CoAP) and Message Queue Telemetry Transport (MQTT). Diameter is an authentication, authorization, and accounting protocol for computer networks and is described in Internet Engineering Task Force (IETF) Request for Comments (RFC) 6743. Existing systems are not capable of determining which source, of a plurality of sources, contains the information requested, correlating data from multiple sources, perform analytics and present the information in a coherent format in a network wide scalable way. In addition, existing systems require more than one entity to perform similar functions, but still lack scalability to provide network scale solutions.

In various embodiments, network, service, and subscriber abstraction module 104 may further function as a data flow engine that incrementally correlates the data from various sources to extract useful network-wide information. This along with high horizontal scalability allows network, service, and subscriber abstraction module 104 to provide network level abstraction to applications and OSS systems in Enterprise Applications 126. In various embodiments, network, service, and subscriber abstraction module 104 collects network wide data, performs a set of transformations on the data and correlates the data to make it presentable in a coherent format that can be used by entities outside network, service, and subscriber abstraction module 104.

In particular embodiments, communication system 100 provides for a flexible mobile architecture/framework that enables operators to quickly create and modify use cases for monetization by harvesting, abstracting, and monetizing intelligence from the network. Monetization uses which may include such services as general consumer control points, targeted ad insertion, video, Femto/Wi-Fi/location/presence information, collaboration, telepresence, congestion/control, telematics, remote/video surveillance, automatic metering infrastructure, ATM/POS, remote monitoring/automation, information display, IMS cloud, voice and video over LTE, and messaging. Many of these monetization uses involve communication from one machine to another without any manual intervention, and the communication flow and data produced from the communication flow are relevant only to the machines.

Figure 2:
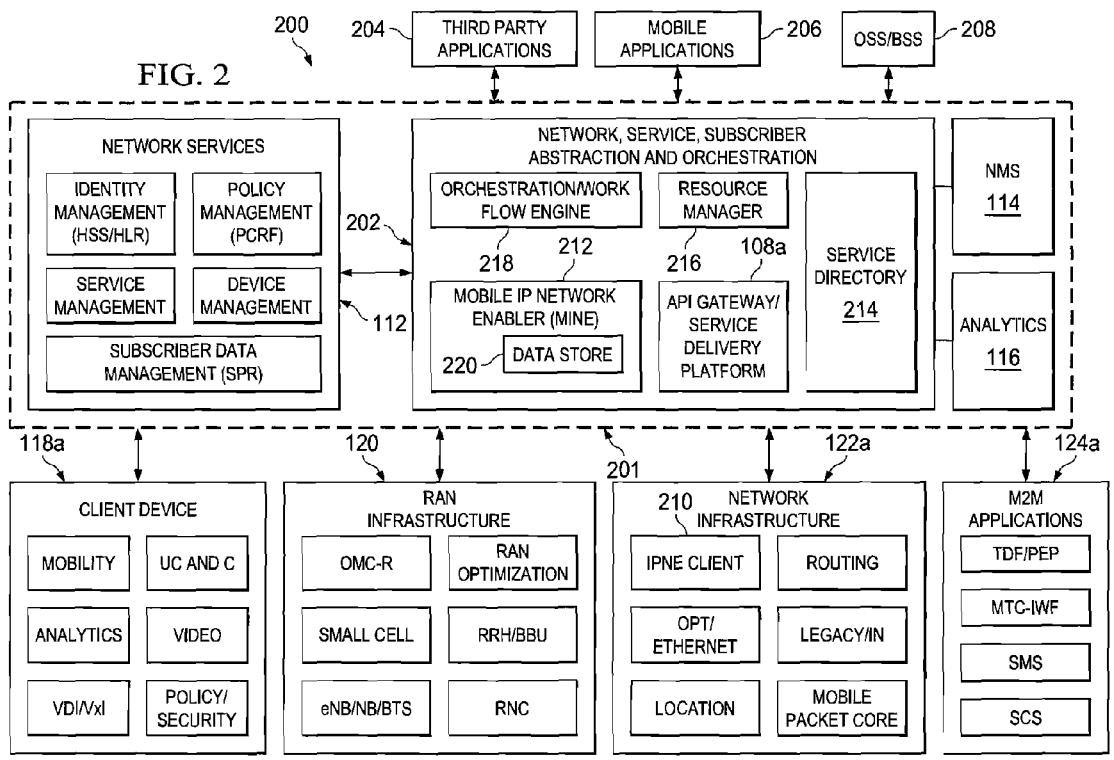
FIG. 2 is a simplified block diagram showing an embodiment of a hierarchical architectural framework of a communication system for orchestrating mobile networks in accordance with another embodiment of the present disclosure.

Referring now to FIG. 2, FIG. 2 is a simplified block diagram showing an embodiment of a hierarchical architectural framework of a communication system 200 for orchestrating mobile networks in accordance with another embodiment of the present disclosure. In the embodiment of FIG. 2, communication system 200 includes four hierarchical layers. A first layer, a network layer, includes client device 118a, radio access network (RAN) infrastructure 120, network infrastructure 122a, and M2M applications 124a. The network layer may include fundamental network elements of one or more mobile packet core platforms and the services contained within these platforms. A second layer may include a network, service, subscriber abstraction, orchestration module 202, analytics module 116, and network management services component 114. A third layer may include a network services 112, and a fourth layer may include higher level services and applications provided by a service provider including third party applications 204, mobile applications 206, enterprise applications 126, OSS/BSS elements 208, and other billing, network management, and third party and/or operator applications. In a particulate embodiment, the third party application 204 is provided by a M2M service provider, and includes an independent OSS/BSS system 208 specifically for the M2M service provider. In a particular embodiment, network services 112, NMS 114, analytics 116 and network, service, subscriber abstraction, orchestration module 202 may be embodied within a server 201. Network infrastructure 122a includes an Internet Protocol network enabler (IPNE) client 210 that performs an interworking function to interface the network layer elements of the mobile packet core with network, service, subscriber abstraction, orchestration module 202. In a particular embodiment, network, service, subscriber abstraction, orchestration module 202 interfaces with capabilities of the mobile platform via Extensible Messaging and Presence Protocol (XMPP)/Extensible Markup Language (XML) and RESTFul interfaces as transport mechanism to expose these capabilities using an XML schema. XMPP is a communications protocol for message-oriented middleware based on XML. XML is a markup language that defines a set of rules for encoding documents. Representational State Transfer (REST) is a style of software architecture for distributed systems and includes requests and responses built around the transfer of representations of resources. A resource can be essentially any coherent and meaningful concept that may be addressed and a representation of a resource is typically a document that captures the current or intended state of a resource. Typically, a client begins sending requests when it is ready to make a transition to a new state. The representation of each application state may contain links that may be used the next time the client chooses to initiate a new state-transition. Conforming to REST constraints is generally referred to as being "RESTful." Capabilities and data that are exposed is stored in network, service, subscriber abstraction, orchestration module 202 database as will be further described herein. The network layer may further include other components that make up the network platform including client side capabilities providing linkages to other domains.

In various embodiments, network, service, subscriber abstraction, orchestration module 202 contains sub-elements including a API gateway/service delivery platform 108, mobile IP network enabler (MINE) component 212, a service directory component 214, a resource manager component 216, and an orchestration/work flow engine 218. MINE component 212 functions as an interface layer to IPNE client 210 and contains a central storage 220 to store network information such as call records and network structures that may be later accessed. In a particular embodiment, central storage 220 may be based upon a distributed file system structure and may be accessed by an XMPP interface. Access to the lower layer and requesting information from the network layer is performed through MINE component 212. MINE component 212 provides a single entry point to the network and also orchestrates network requirements.

Services directory component 214 is configured to publish network capabilities and resource availability for higher layer services. Resource manager component 216 is configured to publish network capabilities and resource availability for applications such as third party and operator applications. In various embodiments, service directory component 214 and resource manager component 216 perform publishing of these capabilities directly through MINE 212 component. In particular embodiments, service directory component 214 and resource manager component 216 publish capabilities through MINE component 212 using an interface such as an XMPP interface. In still other embodiments, service directory component 214 and resource manager component publish capabilities through MINE component 212 using application/3rd party API gateway 108.

API gateway/service delivery platform 108a exposes capabilities to the higher-level services and applications of the fourth layer such as third party applications 204, mobile applications 206, OSS/BSS elements 208, and other billing, network, network management, and third party and/or operator applications. In a particular embodiment, API gateway/service delivery platform 108a exposures capabilities to the higher-level services and applications of the fourth layer via a standards based GSMA OneAPI interface by the Groupe Speciale Mobile Association (GSMA). In another particular embodiment, API gateway/service delivery platform 108a exposures capabilities to the higher-level services and applications of the fourth layer via a standards based OneM2M APIs. API gateway/service delivery platform 108a is further configured to provide adapters to standard service provider billing and backend systems. In at least one embodiment, the combination of these layers allows a service provider to rapidly implement new service and features. Orchestration/work flow engine 218 is configured to orchestrate various network elements and coordinate workflows between network elements using MINE component 212 as will be further described herein.

Analytics module 116 provides functions including leveraging data store 220 provided by MINE component 212 and analyzing network status based upon request from orchestration/work flow engine and responding via a specific trigger that may be applied to the network via a policy function. In a particular embodiment, MINE component 212 is configured to interface with analytics module 116 via an XMPP interface and/or standard mobile interfaces. In one or more embodiments, analytics module 116 may contain an analytics engine component, a modeling component, a profiling component and a visualization component. In various embodiments, analytics module 116 subscribes to information that is contained in data store 220 of MINE component 212 that analytics module 116, and analytics module 116 may uses this information to perform historical trend analysis. In some embodiments, MINE component 212 may be further configured to send real time feeds of data to analytics module 116 so that analytics module 116 may perform immediate processing of the data and/or respond to one or more triggers. In another embodiment, MINE component 212 may request a query be performed on data, making analytics module 116 subservient to MINE component 212, or more specifically making MINE component 212 a controller of analytics module 116. MINE component 212 may then trigger particular actions based on a query response received from analytics module 116.

Network services 112 may provide one or more of identity management, policy management, service management, device management, and subscriber data management functions that may exist within a service provider network. MINE component 212 is configured to provide a link between the functions provided by network services 112 and other network elements.

In accordance with various embodiments, one or more of the network elements of communication system 200, such as the mobile packet core of network infrastructure 122a and the TDF/PEP, optimization, and IMS elements of M2M applications 124a may be subscriber-aware network elements that are aware of the identity of a subscriber utilizing the network elements or services. Further, in various embodiments, network services include subscriber databases such as the HSS/HLR, PCRF, OCS, and SPR. In accordance with various embodiments, network, service, subscriber abstraction, orchestration module 202 provides interconnection between the subscriber-aware network elements and the subscriber databases. In various embodiments, network, service, subscriber abstraction, orchestration module 202 orchestrates and coordinates workflow between the subscriber aware network elements and subscriber databases, and provides protocol translation between the various network elements and databases. In a particular embodiment, the subscriber is the M2M module itself.

In accordance with various embodiments, the above-described framework allows service providers to easily offer services related to their network capabilities, dynamically optimize those capabilities, and create an environment, which enables rapid service enablement. Various embodiments of the described architecture allow a mobile service provider, a fixed line provider, and/or large enterprises to create a platform, which exposes network capabilities and allows application developers and walled gardened application developers to leverage the power of the network. Various embodiments may allow service providers to monetize the capabilities of the network by optimizing the infrastructure and then creating a service framework that allows service providers to quickly and efficiently create new service offers. In at least one embodiment, the above-described architecture integrates with the existing capabilities of the service provide to avoid "rip and replace" scenarios and ensures faster time to market.

One or more embodiments may provide one or more advantages including leveraging the existing service provider environment to eliminate a "rip and replace" scenarios, and allowing easy access to network capabilities which have historically been very difficult for application developers and service providers to access.

In one or more embodiments, create a policy framework having three fundamental elements including policy, network abstraction and orchestration and analytics tied together in conjunction with network access. Various embodiments provide a service creation environment that ties these elements together into existing service provider OSS/BSS systems. Various embodiments of this framework may be used to create/run multiple different services such as business to consumer (B2C), business-to-business (B2B), machine-to-machine (M2M), and security services. Further, one or more embodiments one or more embodiments may provide a massively scalable framework that may be deployed in a cloud based architecture.

In an example workflow, network, service, subscriber abstraction, orchestration module 202 receives a service request from enterprise applications 126 such as a vehicle infotainment application to a module associated with a vehicle. In various embodiments, network, service, subscriber abstraction, orchestration module 202 provides protocol translation between network elements. In a particular example, the request from the third party provider is formatted as an CoAP request. The request includes a request for a guarantee of a particular quality of services for a predetermined time period. In response, orchestration/work flow engine 218 generates a DIAMETER request from the CoAP request and sends the DIAMETER request to the policy management, such as the PCRF, of network services 112 to determine if the service request meets one or more policies associated with the subscriber. Orchestration/work flow engine 218 may also generated a DIAMETER request to the identify management service, such as the HSS, of network services 112 to determine the identity of the subscriber associated with the service request, generate a DIAMETER request to OSS/BSS 208 to determine if the billing system will allow the service request. Orchestration/work flow engine 218 may further send a request to the mobile packet core of network infrastructure 122a to determine if there is any congestion in the network. Orchestration/work flow engine 218 may further send a request to the RAN Optimization of RAN infrastructure 120 to determine if there is congestion on the radio interface. In still other examples, orchestration/work flow engine 218 may request information from analytics module 116 to determine, based on historical information stored by analytics module 116, whether the network will be congested in the predetermined time period. Based on responses to these various requests, orchestration/work flow engine 218 may determine whether the initial request from the enterprise provider will be allowed.

Figure 3:
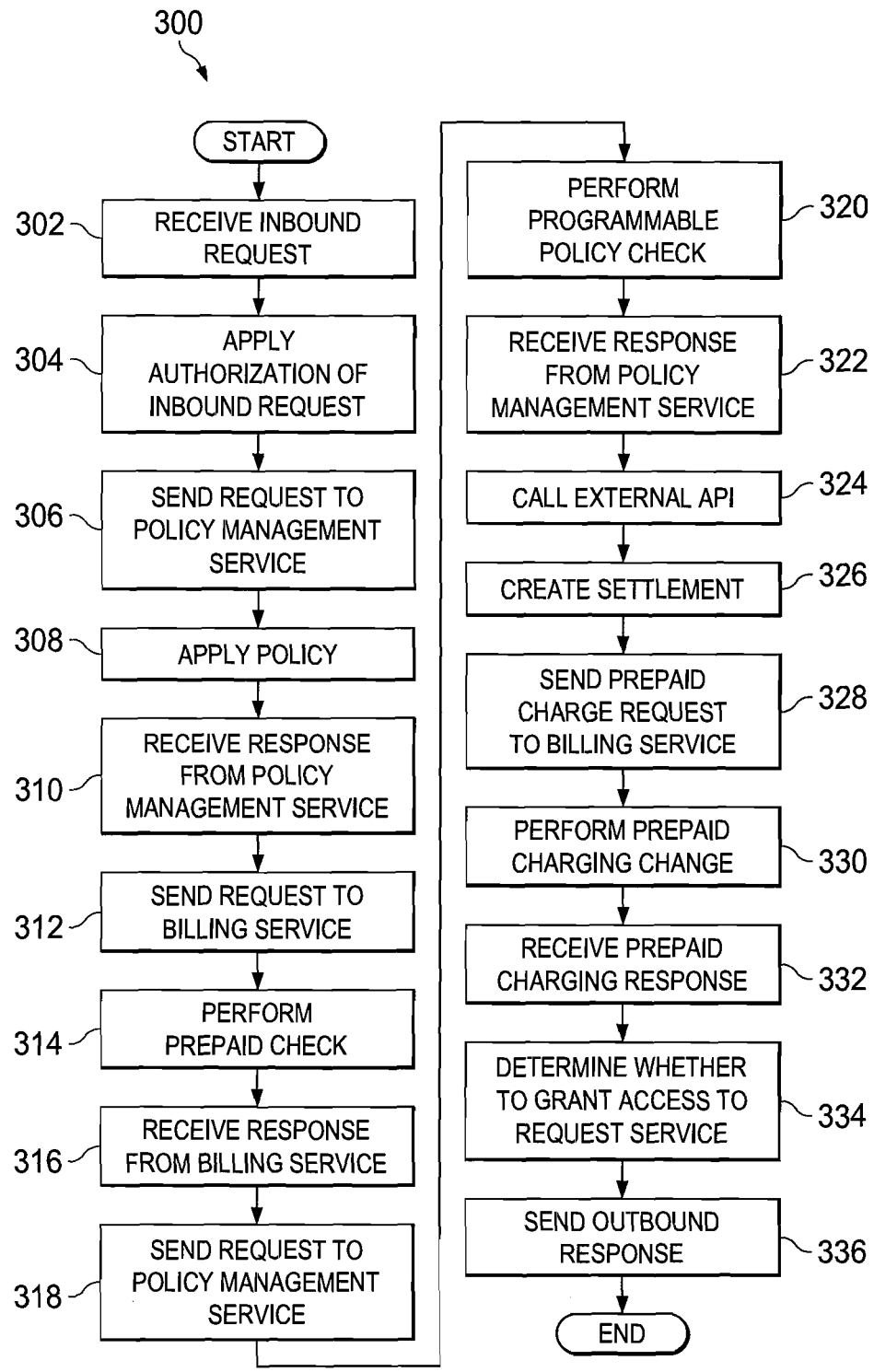
FIG. 3 is a simplified flow diagram of an embodiment of workflow coordination operations performed by a orchestration/work flow engine.

FIG. 3 is a simplified flow diagram 300 of an embodiment of workflow coordination operations performed by orchestration/work flow engine 218. In 302, orchestration/work flow engine 218 receives an inbound service request from client device 118a associated with a subscriber. In a particular embodiment, the inbound service request is an HTTP inbound request. In at least one embodiment, the inbound request includes a request from an application of client device 118a for the providing of one or more services by the network to client device 118a. In a particular example, the request is a request for in-vehicle infotainment, such as a streaming video session or other video/audio collaboration. In 304, orchestration/work flow engine 218 applies authorization into network services 112. In 306, orchestration/work flow engine 218 sends a request to the policy management service of network services 112 to determine whether the inbound request conforms to one or more policies associated with client device 118. In a particular embodiment, the policy management services is a PCRF. In 308, the policy management service applies one or more policies associated with the subscriber to the request to determine if the request is in compliance with the one or more policies. In accordance with various embodiments, a policy may be defined in any number of ways. For example, a policy could describe how to enforce a rule against a particular IP flow, the services that need to be orchestrated together to apply for a particular user service, or a set of security rules. In another example, the policy may describe which services are applicable to an application request and how those services show be orchestrated together in order to provide the requested service. In a particular example, a policy may describe how to orchestrate network analytics functions, Self Optimizing Network (SON) controllers, and protocol translators for a request for a M2M session. In 310, orchestration/work flow engine 218 receives a response from the policy management service regarding whether the request is in compliance with the one or more polices.

In 312, orchestration/work flow engine 218 sends a request to a billing service to perform a prepaid check to determine whether the subscriber has prepaid for the requested service. In a particular embodiment, the billing system is an OCS. In 314, the billing service performs the prepaid check to determine whether the subscriber has prepaid for the requested service. In particular applications of M2M in which there are no "prepaid" users, operations 310 and 312 may not be performed in some embodiments. In 316, orchestration/work flow engine 218 receives a response from the billing service indicating whether the subscriber has prepaid for the requested service. In 318, orchestration/work flow engine 218 sends a request to the policy management service regarding whether the service request complies with one or more programmable policies. In various embodiments, the programmable policies are access control policies that are programmable such as by an application or administrator. In 320, the policy management service performs a check to determine whether the service request complies with the one or more programmable policies. In 322, orchestration/work flow engine 218 receives a response from the policy management service indicating whether the initial request complies with the one or more programmable policies.

In 324, orchestration/work flow engine 218 may call an external application-programming interface (API) in instances in which a third party services needs to be invoked to satisfy the initial service request. In a particular embodiment, the call to the external API is a call to an external HTTP endpoint associated with the external API. In a particular embodiment, the API is the standard OneM2M API. In 326, orchestration/work flow engine 218 creates a settlement for the service request. In 328, orchestration/work flow engine 218 sends a charge request to the billing service in order to request a charge for the service. In 330, the billing system performs a prepaid charging change in order to charge the subscriber for the created settlement. In 332, orchestration/work flow engine 218 receives a prepaid charging response indicating that the prepaid charging change has been performed.

In 334, orchestration/work flow engine 218 determines whether to grant access to the requested service to client device 118a. In at least one embodiment, orchestration/work flow engine 218 determine whether to grant access to the requested service by correlating the responses received from the network elements and services and making a decision based on the responses regarding whether the service request will be granted. For example, in a particular embodiment if any of the responses in the chain or responses indicate that the service request should not or cannot be granted, orchestration/work flow engine 218 will not grant the service request to client device 118a. For example, if the PCRF indicates that the service request will not satisfy a particular policy, if analytics module 116 indicates that there will not be available QOS for the predetermined time period necessarily to provide the requested service, or if the OCS indicates that the subscriber will not have enough balance remaining to pay for the requested service, orchestration/work flow engine 218 may indicate that the requested service will not be granted to client device 118a. In 336, orchestration/work flow engine 218 sends an outbound response message to client device 118a indicating whether the client device 118a is granted access to the requested service. In a particular embodiment, the outbound response is an HTTP outbound response.

Figure 4:
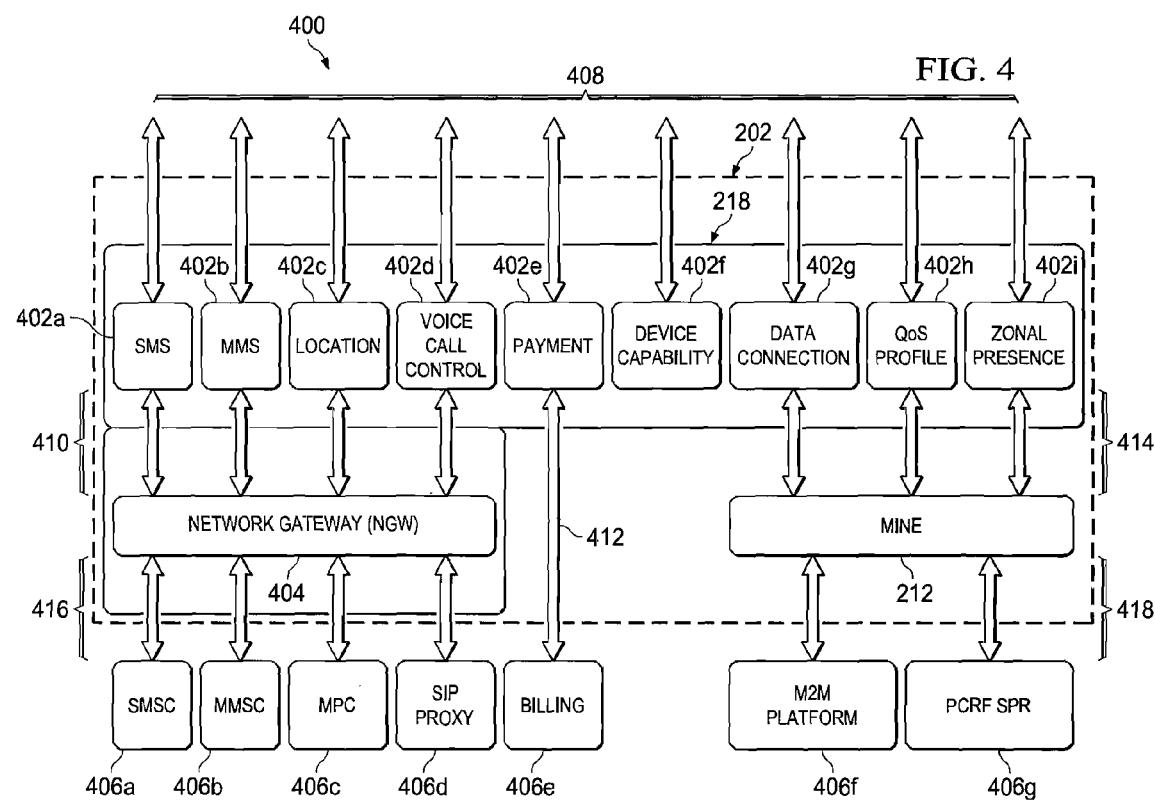
FIG. 4 illustrates an embodiment of the protocol translation platform of the orchestration/work flow engine.

FIG. 4 illustrates an embodiment of a protocol translation platform 400 of orchestration/work flow engine 218. In the embodiment illustrated in FIG. 4, orchestration/work flow engine 218 includes one or more protocol translation modules 402a-402i. In the particular illustrated embodiment, orchestration/work flow engine 218 includes short message service (SMS) translation module 402a, multimedia messaging service (MMS) translation module 402b, location translation module 402c, voice call control translation module 402d, payment translation module 402e, device capability translation module 402f, data connection translation module 402g, QoS profile translation module 402h, and zonal presence translation module 402i. Network, service, subscriber abstraction, orchestration module 202 further includes network gateway (NGW) translation module 404, and MINE 212 in communication with orchestration/work flow engine 218.

Network, service, subscriber abstraction, orchestration module 202 is in further communication with one or more network elements 406a-406g. In the illustrated embodiment, the one or more network elements 406a-406g include short message service center (SMSC) 406a, multimedia messaging service center (MMSC) 406b, mobile platform controller (MPC) 406c, Session Initiation Protocol (SIP) Proxy server 306d, billing service 406e, M2M platform 406f, and PCRF/SPR 406g. In the particular embodiment illustrated in FIG. 4, SMS translation module 402a, MMS translation module 402b, location translation module 402c, and voice call control translation module 402d are in communication with network gateway translation module 404, and payment translation module 402e is in communication with billing service 406e. Data connection translation module 402g, QOS profile translation module 402h, and zonal presence translation module 402i are in communication with MINE 212. NGW 404 is in further communication with SMSC 406a, MMSC 406b, MPC 406c, and SIP proxy server 406d. MINE 212 is in further communication with M2M platform 406f and PCRF/SPR 406g.

Each of protocol translation modules 402a-402i and network gateway translation module 404 are configured to receive a message, such as a request, formatted in a first protocol format and translate the message to be formatted in a second protocol format. In the illustrated embodiment of FIG. 4, each protocol translation modules 402a-402i is configured to receive a message formatted in a first format 408. In a particular example, first protocol format 408 is in a M2M format, such as Message Queue Telemetry Transport (MQTT) or Constrained Application Protocol (CoAP). Protocol translation modules 402a-402d may be configured to translate the message received in the first protocol format 408 to a second protocol format 410 and communicate the translated message to NGW 410. Payment translation module 402e may be configured to translate the message in first protocol format 408 to a third format 412 and communicate the translated message to billing service 406e. Protocol translation modules 402g-402i may be configured to translate the message in the first protocol format 408 to a fourth format 414 and communicate the translated message to MINE 212. In a particular embodiment, fourth protocol format 414 is an XMPP protocol format. Network gateway translation module 404 may be further configured to translate the message received from each of protocol translation modules 402a-402d in second protocol format 410, translate the message into a fifth protocol format 416, and communicate the translated message to network elements 406a-406d. MINE 212 may be configured to translate message received from protocol translation modules 402g-402i in fourth format 414 to a sixth protocol format 418 and communicate the translated message to network elements 406f-406g.

Figure 5:
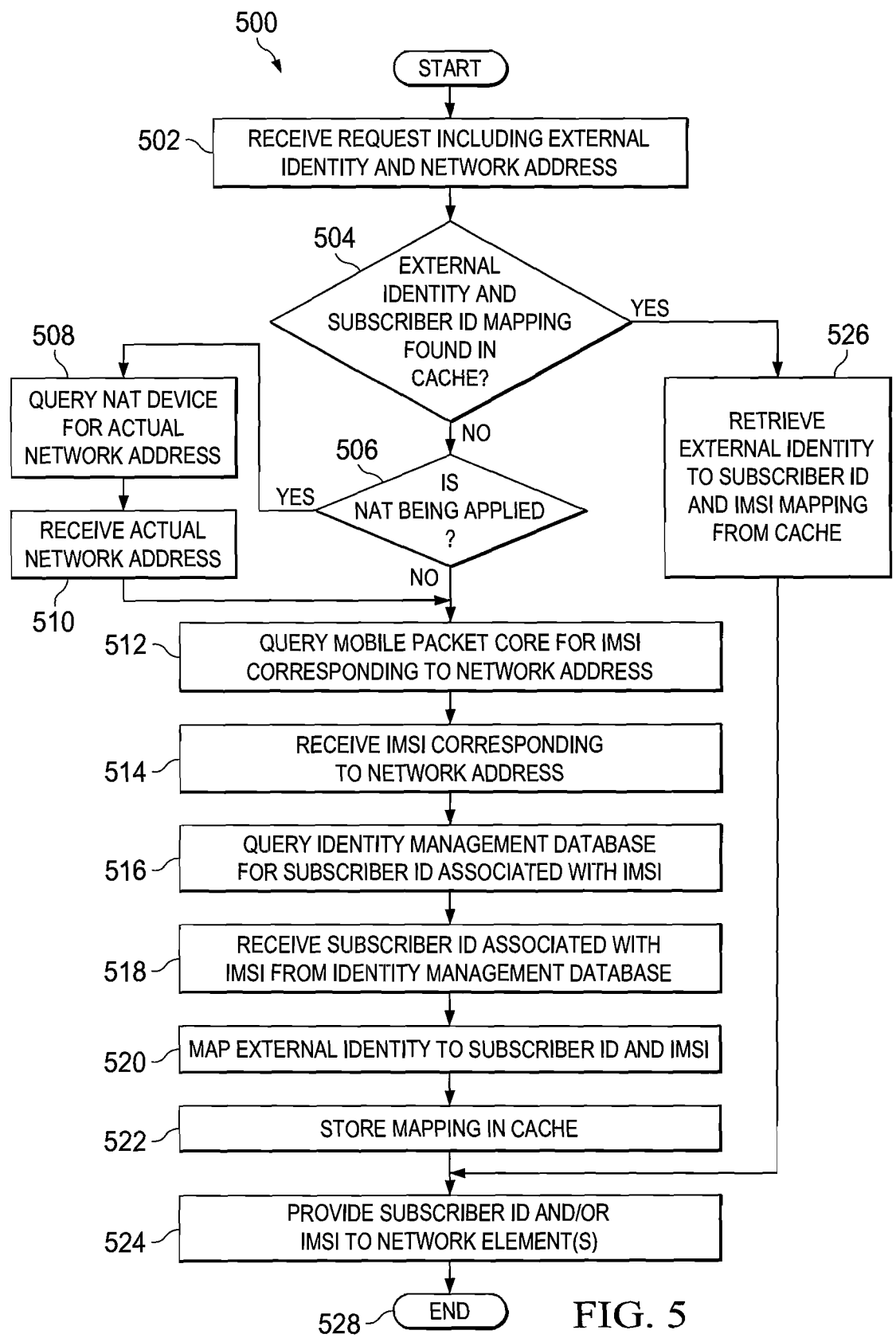
FIG. 5 is a simplified flow diagram of an embodiment of subscriber identity normalization operations performed by the orchestration/work flow engine.

FIG. 5 is a simplified flow diagram 500 of an embodiment of subscriber identity normalization operations performed by orchestration/work flow engine 218. In 502, orchestration/work flow engine 218 receives a request including an external identity and network address associated with a M2M module which connects to the mobile network. In a particular embodiment, the request may be received from a third party service provider such as a M2M service provider, in response to a request from a module associated with the external identity used by the third party service provider to identify the user. In the case of a M2M service provider, the module may align to a standard way to identify the module. In a particular embodiment, the module is associated with a vehicle, and the external identity is a Vehicle Identification Number (VIN). In a particular embodiment, the network address is an Internet protocol (IP) address associated with the user as seen by the third party M2M service provider. This IP address may be different from the IP address known to the mobile network if Network Address Translation (NAT) is being applied. In 504, orchestration/work flow engine 218 determines whether a mapping of the received external identity and a mobile network subscriber identifier (ID) is found in a cache associated with orchestration/work flow engine 218. If a mapping of the external identity and a mobile network subscriber ID is not found in the cache, the operations continue to 506. In 506, orchestration/work flow engine 218 determines whether NAT is being applied to the received network address. If NAT is being applied to the received network address, the operations continue to 508 in which orchestration/work flow engine 218 queries a NAT device responsible for the network address translation for an actual network address associated with the received request. In 510, orchestration/work flow engine 218 receives the actual network address associated with the received request and continues to 512. If in 506, orchestration/work flow engine 218 determines that NAT is not being applied, the operations continue to 512.

In 512, orchestration/work flow engine 218 queries the mobile packet core of network infrastructure 122a for an International Mobile Subscriber Identity (IMSI) corresponding to the network address. In 514, orchestration/work flow engine 218 receives the IMSI corresponding to the network address from the mobile packet core. In 516, orchestration/work flow engine 218 queries an identity management database for a subscriber identifier (ID) associated with the IMSI. In a particular embodiment, the subscriber ID is a Mobile Subscriber Integrated Services Digital Network-Number (MSIDN) or a mobile phone number associated with the M2M module. Although particular embodiments have been described using IMSI and MSIDN identifiers, it should be understood that in other embodiments any type of subscriber identifier may be used. In at least one embodiment, the identity management database is an HSS/HLR. In 518, orchestration/work flow engine 218 receives the mobile network subscriber ID associated with the IMSI from the identity management database. In 520, the external identity is mapped to the mobile network subscriber ID and the IMSI. In 522, orchestration/work flow engine 218 stores the mapping of the external identity, subscriber ID, and IMSI in the cache associated with orchestration/work flow engine 218.

In 524, orchestration/work flow engine 218 provides the subscriber ID and/or IMSI to one or more network elements that will use the IMSI and/or subscriber ID to fulfill the request for service. If it is determined in 504, that the external identity and mobile network subscriber ID mapping are found in the cache associated with orchestration/work flow engine 218, the operations continue to 526 in which orchestration/work flow engine 218 retrieves the mobile network subscriber ID and IMSI mapping to the external identity from the cache and proceeds to 524. After 524, the operations end at 528. By caching of the mapping of the external identity and externally understood IP address to the subscriber ID, IMSI and mobile network-understood IP address, subsequently requests including the external identity do not require another query of the network elements such as the identity management database or mobile packet core to determine the mobile network subscriber identity and IMSI and IP address mapping.

Figure 6:
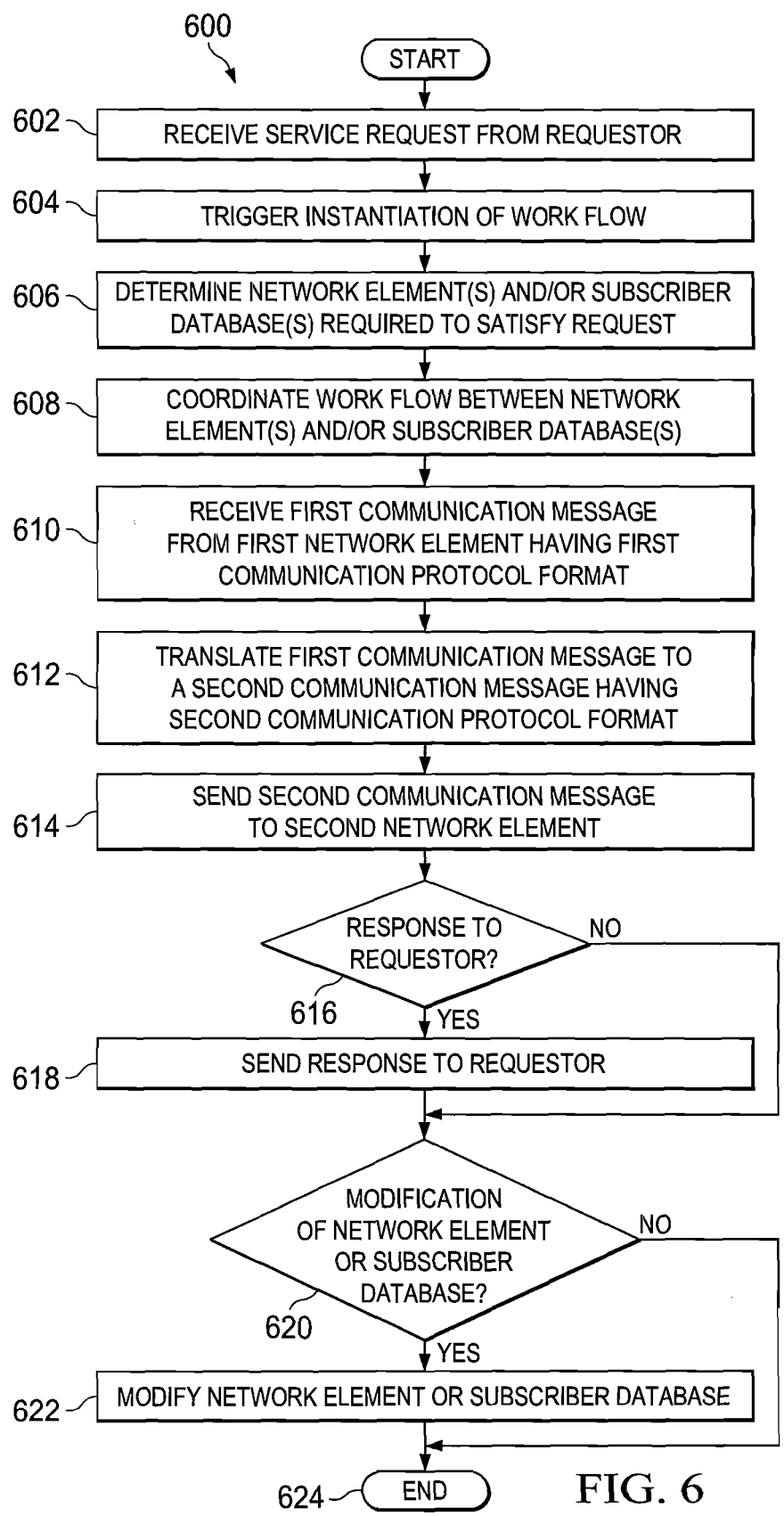
FIG. 6 is a simplified flow diagram of another embodiment of workflow coordination operations performed by the orchestration/work flow engine.

FIG. 6 is a simplified flow diagram 600 of another embodiment of workflow coordination operations performed by orchestration/work flow engine 218. In 602, orchestration/work flow engine 218 receives a service request from a requester. In 604, an instantiation of workflow is triggered in response to the request. In one embodiment, the request is received from an internal network element associated with a requester located inside of communication system 200. In a particular application, the request is received from one of M2M application 124a such as the MTC-IWF. In another example, analytics module 116 may detect congestion and send the request to trigger the orchestration/work flow event. In still another embodiment, the request is received from an external network element that requires the instantiation of a workflow, which will result in a response to the requestor. For example, the request may be received from a third-party M2M service provider. In 606, orchestration/work flow engine 218 determines one or more network elements and/or one or more subscriber databases that required satisfying and orchestrating the request. In 608, orchestration/work flow engine 218 coordinates workflow between the one or more network element(s) and/or subscriber database(s) in order to satisfy the request.

In 610, orchestration/work flow engine 218 receives a first communication message from a first network element having a first protocol format. In 612, orchestration/work flow engine 218 translates the first communication message to a second communication message having a second communication protocol format. In 614, orchestration/work flow engine 218 sends the second communication message to a second network element.

In 616, orchestration/work flow engine 218 determines whether a response to the requester is required. If a response to the requester is required, orchestration/work flow engine 218 sends a response to the requester in 618 and the operations continue to 620. If it is determined in 616 that a response to the requestor is not required, the operations continue to 620. In 620, orchestration/work flow engine 218 determines whether modification of one or more network elements and/or subscriber databases is required by the workflow. If modification of one or more network elements and/or subscriber databases within communication system 200 is required, the operations continue to 622. In 622, orchestration/work flow engine 218 modifies the one or more network elements and/or subscriber databases. In particular embodiments, the modification of configuration information or other data within the one or more network elements and/or subscriber databases.

In a particular example, RAN optimization system of RAN infrastructure 120 detects congestion and notifies PCRF of network services 112 that there is congestion through orchestration/work flow engine 218. The PCRF may instantiate a workflow that requests that video optimization be instantiated for all heavy network users that are nearing their limit on the amount of data that they can consume for the month. Accordingly, the PCRF may initiate a workflow in which the orchestration/work flow engine 218 determines me the heavy users who are nearing their quota limitation by querying the analytics module 116 to determine who are the heavy users, query the online charging system to determine the users who are nearing their quota, return a response to the PCRF. The PCRF may instantiate a rule, which enforces video optimization for these users and triggers a service path where traffic associated with those users goes to the video optimization.

The operations then continue to 624 in which the operations end. If it is determined that modification of one or more network elements and/or subscriber databases is not required, the operations continue to 624 in which the operations end.

FIG. 7 is a simplified diagram of an embodiment of a call flow 700 of network, service, subscriber abstraction, orchestration module 202. The call flow 700 is illustrated using number of network elements and subscriber databases including a enterprise M2M application of M2M service provider 702, a network abstraction layer (NAL) 704 of network, service, subscriber abstraction, orchestration module 202, a policy server (PCRF) 706, a subscriber policy register (SPR)/user data repository (UDR) 708, network element 1 to network element x (NE1 ... X) 710, analytics (AN) 712, and user equipment 714. In at least one embodiment, user equipment 714 is client device 118*a*. In 716, UE 714 sends a session start request (SessionStart) to M2M service provider 702. In the particular embodiment illustrated in FIG. 7, the session start request is a request for a TurboBoost service in which UE 714 is requesting an on-demand dynamic increase in network performance. In 718, M2M service provider 702 sends a Boost Availability Request (BoostAvailRequest) to NAL 704. In 720, NAL 704 checks for the availability of the resource(s) required to satisfy the session start request. In 722, NAL 704 sends a Resource Model Request to (ResrchModelRequest) to AN 712 requesting analytics modeling of whether the resource will be available. In 724, AN 712 sends a Resource Model Response (RsrcModelResponse) indicating whether the resource will be available to NAL 704. In 726, NAL 704 sends a Boost Allow Request (BoostAllowRequest) to PCRF 706 requesting whether the service request is to be allowed based upon one or more policies. In 728, PCRF 706 sends a Boost Authorization Request (BoostAuthRequest) to SPR/UDR 708. In 730, SPR/UDR 708 sends Boost Authorization Response (BoostAuthResponse) to PCRF 706. In 732, PCRF 706 sends a Boost Allow Response (BoostAllowResponse) to NAL 704. In 734, NAL 704 sends a Boost Availability Response (BoostAvailResponse) to M2M service provider 702.

In 736, M2M service provider 702 sends an Upgrade Notification message (UpgradeNotify) to UE 714 indicating that there will be an additional charge to utilize the requested service. In 738, the user accepts the charge. In 740, UE 714 sends an Upgrade Confirmation message (UpgradeConfirm) to M2M service provider 702. In 742, M2M service provider 702 sends a Boost Request (BoostRequest) to NAL 704. In 744, NAL 704 sends a Service Profile Request (SvcProfileRequest) to PCRF 706 requesting user profile information associated with the user of UE 714. In 746, PCRF 706 sends a Service Profile Response (SvcProfileResponse) to NAL 704 including the user profile information. In 748, NAL 704 sends one or more Policy Charging Control (PCC) Requests (PCCRequest1 ... x) to one or more of network elements (NE1 ... x) 710. In 750, one or more of network elements (NE1 ... x) 710 sends one or more PCC Responses (PCCResponse1 ... x) to NAL 704.

In 752, NAL 704 performs orchestration of a BSS/OSS and external network elements necessary to provide the requested service. In 754, NAL 752 sends a Boost Response (BoostResponse) to M2M service provider 702. In 756, network elements (NE1 ... x) 710 send one or more Resource Update messages (ResourceUpdate1 ... x) to NAL 704. In 758, NAL 704 sends one or more acknowledgement messages (Ack1 ... x) to one or more of network elements (NE1 ... x) 710. It should be understood that each of the messages exchanged between the network elements and subscriber databases may be received in a particular protocol format utilized by the sending network element and translated to a particular protocol format utilized by the receiving network element.

FIG. 8 is a simplified block diagram 800 illustrating a particular embodiment of server 201 of communication system 200 of FIG. 2. The particular embodiment of server 201 of FIG. 2 includes a processor(s) 802, memory element 804, and network, service, subscriber abstraction, orchestration module 202. Processor(s) 802 are configured to execute software instructions to perform various operations of server 201 as described herein. Memory element 804 may be configured to store software instructions and data associated with server 201. Network, service, subscriber abstraction, orchestration module 202 is configured to implement the various orchestration, workflow coordination, and translation functions as described herein.

Although the particular embodiment illustrated in FIG. 8 shows server 201 as including a single node, it should be understood that in other embodiments, server 201 may include any number of nodes. In still other embodiments, a cluster may be formed of any number of processing nodes distributed throughout a number of servers or other network elements within a communication network.

In still other embodiments, mobile IP enabler (MINE) component 212 is configured to provide for integrated signaling between one or more network elements associated with a mobile data network and one or more network elements associated with enterprise networks. In particular embodiments, MINE component 212 provides a network address translation function in which an identifier, such as an Internet Protocol (IP) address, associated with a particular M2M module is mapped to an identifier, such as a VIN, used by an enterprise M2M service to identify a particular user. Examples of enterprise services offerings that may be provided to the user equipment device by one or more enterprise networks include telematics, in-vehicle infotainment, and ATM/POS systems.

FIG. 9 is a simplified block diagram of an embodiment of a communication system 900 for orchestrating mobile data networks in a machine-to-machine (M2M) environment. In a case of industrial instrumentation M2M may include a context in which a device having a sensor captures an event (such as a temperature, pressure, inventory level, etc.) at a particular location, and the device relays the captured event information through an access network (wireless, wired or hybrid) to an application in an application program that translates the captured event information into meaningful information to be presented to a user. FIG. 9 shows network, service, and subscriber abstraction layer 202 including mobile IP enabler (MINE) component 212, API gateway 108, network abstraction layer module 902, service layer module 904, and service broker 906. Network, service, and subscriber abstraction layer 202 is in communication with an application platform 908.

In the illustrated embodiment, application platform 908 includes API management module 910 and one or more application modules 912. In at least one embodiment, API management module 910 may be configured to access API gateway 108 and application(s) 912 may be configured to receive and process sensor information received from M2M module 920. Application platform 908 is in further communication with an end user 914 and one or more access network(s) 916. In one or more particular embodiments, access network(s)

916 may include one or more wireless networks, one or more wired networks, or a hybrid of wireless and wired networks. In a particular embodiment, access network(s) 916 may include one or more of a RAN infrastructure and/or other network infrastructure. In particular embodiments, access network(s) 916 may include a core network including policy enforcement and mobility management functions.

Network, service, and subscriber abstraction layer 202 is in further communication with a billing system 918. Access network(s) 916 is in further communication with a M2M module 920. In a particular embodiment, billing system 918 may include an OSS/BSS including billing/rating, settlement, business intelligence, and enterprise resource planning (ERP)/customer relationship management (CRM) functions. In the illustrated embodiment, M2M module 920 includes a device application module 922 for executing one or more device applications, and one or more sensors 924 associated with M2M module 920 for capturing sensed data.

Communication system 900 further includes a network address translation (NAT) module 926 coupled between application platform 908 and access network(s) 916. In one or more embodiments, NAT module 926 is configured to correlate an access network identifier, such as a mobile network subscriber identity, associated with M2M module 920 with an external identifier associated with M2M module 920 used by application platform 908.

As will be further described herein, in various embodiments MINE component 212 is configured to receive network utilization data and/or other network data associated with one or more networks such as access network(s), and determine pricing information for the use of the networks at a particular time period based upon the utilization data. In one or more embodiments, MINE 212 may send a request to analytics module 116 to analyze the received network utilization data, and analytics module 116 may analyze the network utilization data using current utilization data and/or historical utilization data to model expected network utilization during a predetermined time period. MINE component 212 may be further configured to receive the analyzed utilization data from analytics module 116, determine pricing information for use of the networks at one or more particular time periods, and send the pricing information through API gateway 108 to application platform 908. Accordingly, in one or more embodiments, MINE component 212 may transmit messages through API gateway 108 up to application(s) 912 (such as third-party applications) to inform application(s) 912 of an advertised price to utilize access network(s) 916 to transfer data between M2M module 920 and application(s) 912. End user 914 may use the advertised pricing information to make a determination regarding when it is desired that M2M Module 920 is to transmit data of a certain type and/or class. Based upon the pricing information, application platform 908 may determine whether to use the network within the particular time period. MINE component 212 may be further configured to send the pricing information to billing system 918 so that billing system 918 may charge application platform 908 for use of access network(s) 916 at the current rate as determined by MINE component 212. Accordingly, when a rate change decision is made by MINE component 212, it will inform billing system 918 of the new rate information indicating a particular rate within a particular time period. In particular embodiments, multiple classes of service for different classes of users could be used in which each class of service has a different pricing rate. For example, MINE component 212 may advertise a certain price for M2M applications and a different price for content caching applications at the same time.

In the particular embodiment illustrated in FIG. 9, application(s) 912 may be configured to request sensor data from M2M module 920 during a time period having an acceptable rate for data utilization of access networks(s), and device application 922 of M2M module 920 may be configured to capture sensor information from sensor(s) 924 and transmit the sensor information to application(s) 912 during the predetermined time period. In a particular instance, end user 914 may determine that certain data for which it is not important to receive the data in real time should be transmitted when there is low utilization on access network(s) 916 when module application 922 may pass traffic across access network 916 for a lowest cost. In another instance, end user 914 may determine that certain data is desired to be received in real-time regardless of cost.

In an example implementation of a machine-to-machine application, M2M module 920 may be configured at one or more oil well sites to provide telemetry data to application(s) 912 of application platform 908. For example, end user 914 may desire to receive reports indicating how many gallons were pumped, operating conditions, wear life on a pump motor, pump pressures, etc. on regular intervals. Traditionally, end user 914 may be required to pay whatever costs the provider is charging for use of the access network at the time that the data is transmitted. However, wireless networks undergo significant utilization peaks and troughs in which an operator may want to lower the cost of delivering traffic when there is little traffic on the network and raise the cost of delivering traffic when the network is busy. Typically, commuting during rush hour is a peak time on the network. In an M2M application, some telemetry data may be somewhat time-sensitive but not so time-sensitive that the data is required in real-time. For example, for hourly pump updates it may not be necessary for application platform 908 to receive the data exactly on the hour. The third-party application may instead schedule the update when it is more cost effective for delivery of the data. In addition, it may be desired to collect other statistics daily such as maintenance conditions and pump pressure. In another example, end user 914 may wish to capture an image of the pump mechanism every day so that it can be examined for wear or some other visual condition that can only be determined visually. However, the image data may be fairly large. If application platform 908 has cost information regarding the price of transmitted the data, application(s) 912 may be configured to implement business logic indicating that the image information does not need to be received in real-time, and as a result it is desired to receive the data at the lowest cost offered. In contrast, it may be desired to transmit an indication of a fault in the oil well immediately after detection of such a fault regardless of cost so that the oil well may be brought back online as soon as possible to minimize loss in money due to the inactivity of the oil well.

In some embodiments, MINE component 212 may utilize location information of M2M module 920 so that advertised bids for network use may be determined based upon network utilization in the network at a particular location. In a particular example, MINE component 212 may advertise a high price for a first location, a moderate price a second location, and/or a low price for a third location. In an example operation of communication system 900, MINE component 212 collects utilization data from access network(s) 916 such as RAN infrastructure 120 and/or network infrastructure 122 to determine utilization of access network(s) 916.

In a particular embodiment, MINE component 212 may provide the utilization data to analytics module 116, and analytics module 116 performs analytics and statistical modeling of network utilization, such as averaging of utilization over a period of time, to determine an expected utilization of access network(s) 916 at one or more predetermined time periods. Analytics module 116 may be configured to provide information indicative of the expected utilization of access network(s) 916 at the one or more predetermined time periods to MINE component 212. MINE component 212 may then determine pricing information for utilization of access network(s) 916 at the predetermined time periods for one or more classes and/or types of traffic and advertise the pricing information through API gateway 108 to particular application(s) 912 that have subscribed to receiving the pricing information. In a particular embodiment, MINE component 212 may advertise a current rate as well as a projected rate schedule based on the results received from analytics module 116. your analytics (estimate). In various embodiments, a rate may be advertised in a variety of ways such as a specific bit rate for a specific price (ex. $0.03 per 100 kb) or in particular rate categories such as high, medium, or low rate categories.

In some embodiments, MINE component 212 may be configured to determine and advertise a new current rate for a given interval in response to an unexpected change in network utilization and application(s) 912 may make a determination regarding whether it wishes to utilize access network(s) 916 at the new rate. For example, in a situation in which there is an emergency such as a natural disaster and network utilization increases greatly, an operator of access network(s) 916 may not want M2M applications sending data during this time because they were previously informed that the particular time period would have a low rate. Accordingly, MINE component 212 may immediately advertise a new increased rate for M2M applications in order to discourage usage by M2M applications during this time.

In still other embodiments, MINE component 212 may receive regarding current network utilization and change the current pricing information accordingly. For example, MINE component 212 may offer a low rate for M2M applications and receive feedback that a large number of M2M applications have taken advantage of the low rate to transmit information. MINE component 212 may allow such usage for an advertise interval, such as an interval of one minute, and then offer a medium rate to try to back off usage of the network.

Figure 10:
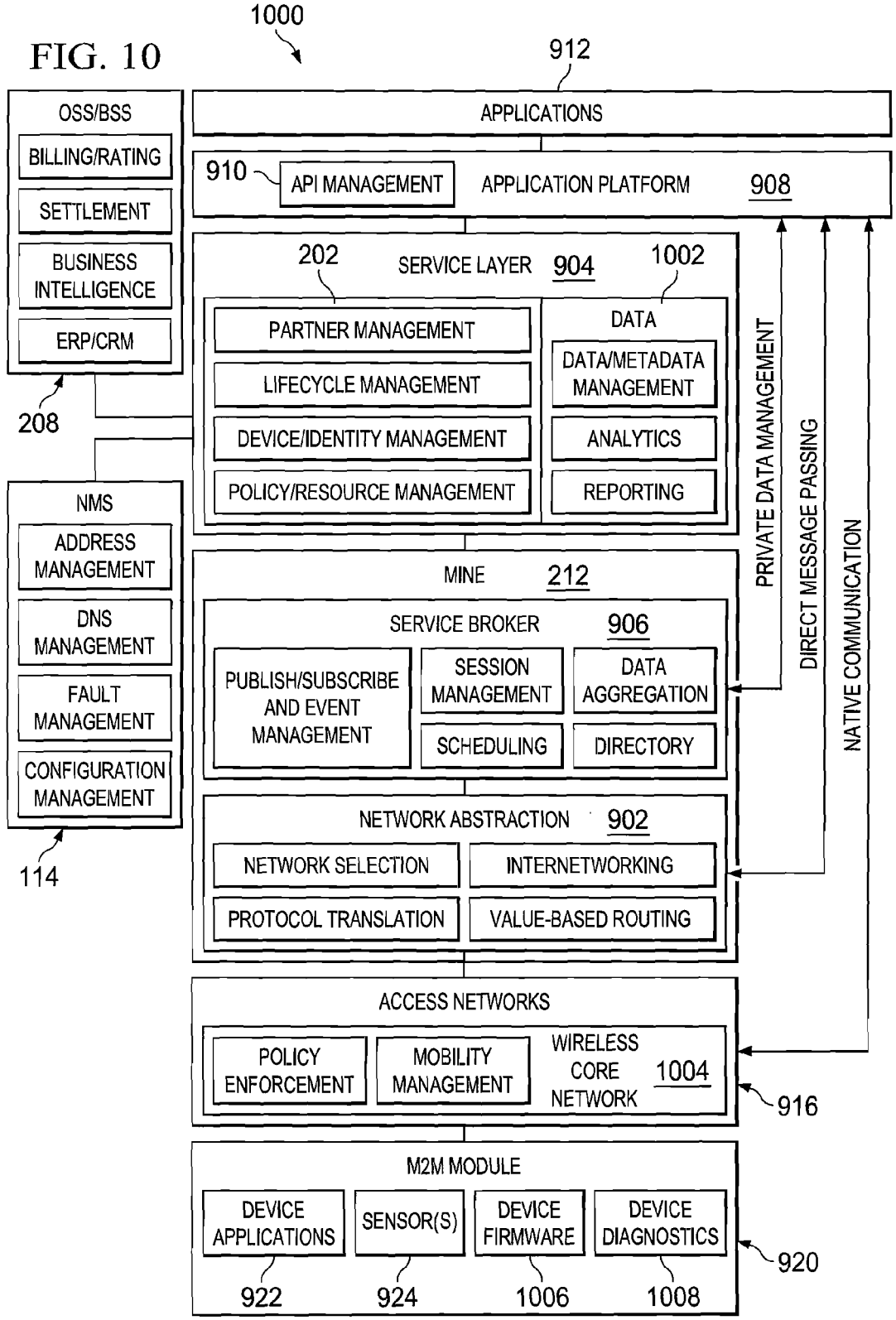
FIG. 10 is a simplified diagram of communication layers of the communication system of FIG. 9 for orchestrating mobile data networks in a machine-to-machine (M2M) environment.

FIG. 10 is a simplified diagram of communication layers 1000 of communication system 900 for orchestrating mobile data networks in a machine-to-machine (M2M) environment. Communication layers include applications 912 in communication with application platform 908 having API management module 910. Application platform 908 is in further communication with service layer 904. Service layer 904 includes network, service, subscriber abstraction layer 202 and data management components 1002. Data management components 1002 includes data/metadata management, analytics, and reporting components.

Service layer 904 is in further communication with service broker 906. In a particular embodiment, service broker 906 includes publish/subscribe & event management, session management, data aggregation, scheduling, and directory components. In at least one embodiment, service layer 904 may be in further communication with OSS/BSS 208 and NMS 114. In the particular embodiment illustrated in FIG. 10, MINE component 212 includes network abstraction layer 902 and service broker 906, network, service, subscriber abstraction layer 202 includes MINE component 212 as well as partner management, lifecycle management, device/identity management, and policy/resource management components. In the particular embodiment illustrated in FIG. 10, OSS/BSS 208 further includes billing/rating, settlement, business intelligence, and enterprise resource planning (ERP)/customer relationship management (CRM) components. In the particular embodiment illustrated in FIG. 10, NMS 114 may include address management, DNS management, fault management, and configuration management components.

In a particular embodiment, service broker 906 is provided by an operator. Service broker 906 is in further communication with network abstraction layer 902. In a particular embodiment, network abstraction layer module 902 includes network selection, protocol translation, internetworking, and value-based routing components. Network abstraction layer 902 is in further communication with access network(s) 916. In a particular embodiment, access network(s) 916 includes a wireless core network 1004 including policy enforcement and mobility management components.

In one embodiment, application platform 908 may communicate with M2M module 920 using native communication to push/pull data directly through access network(s) 916 without passing through network, service, subscriber abstraction layer 202. In another embodiment, M2M module 920 may communicate with network abstraction layer module 902 via access network(s) 916, and network abstraction layer module 902 communicates the data to application platform 908 through API gateway 108 using direct messaging. In still another embodiment, M2M module 920 may communicate with service layer module 904 via access network(s) 916, and service layer module 904 communicates the data to application platform 908 through API gateway 108.

In one or more embodiments, M2M module 920 may communicate with application platform 908 via access network(s) 916 using service broker 906. In such an embodiment, one or more applications 912 may send a request to service broker 906 to be notified when it receives pricing information from MINE component 212 that meets particular requirements of the one or more application 912. When service broker 906 receives pricing information that meets the particular requirements, service broker 906 sends a message to the particular application 912 indicating that the requirements have been met. Application(s) 912 may then determine whether to utilize the network at the advertised price. For example, application(s) 912 may send pricing requirements to service broker 906 to indicate that it wishes to utilize the network if it receives a low price within the next twelve hours, and utilize the network at a medium price if it does not receive a low price within twelve hours. In particular embodiments, application platform 908 may communicate with MINE component 212 using an extended GMSA OneAPI or OneM2M protocol.

Figure 11:
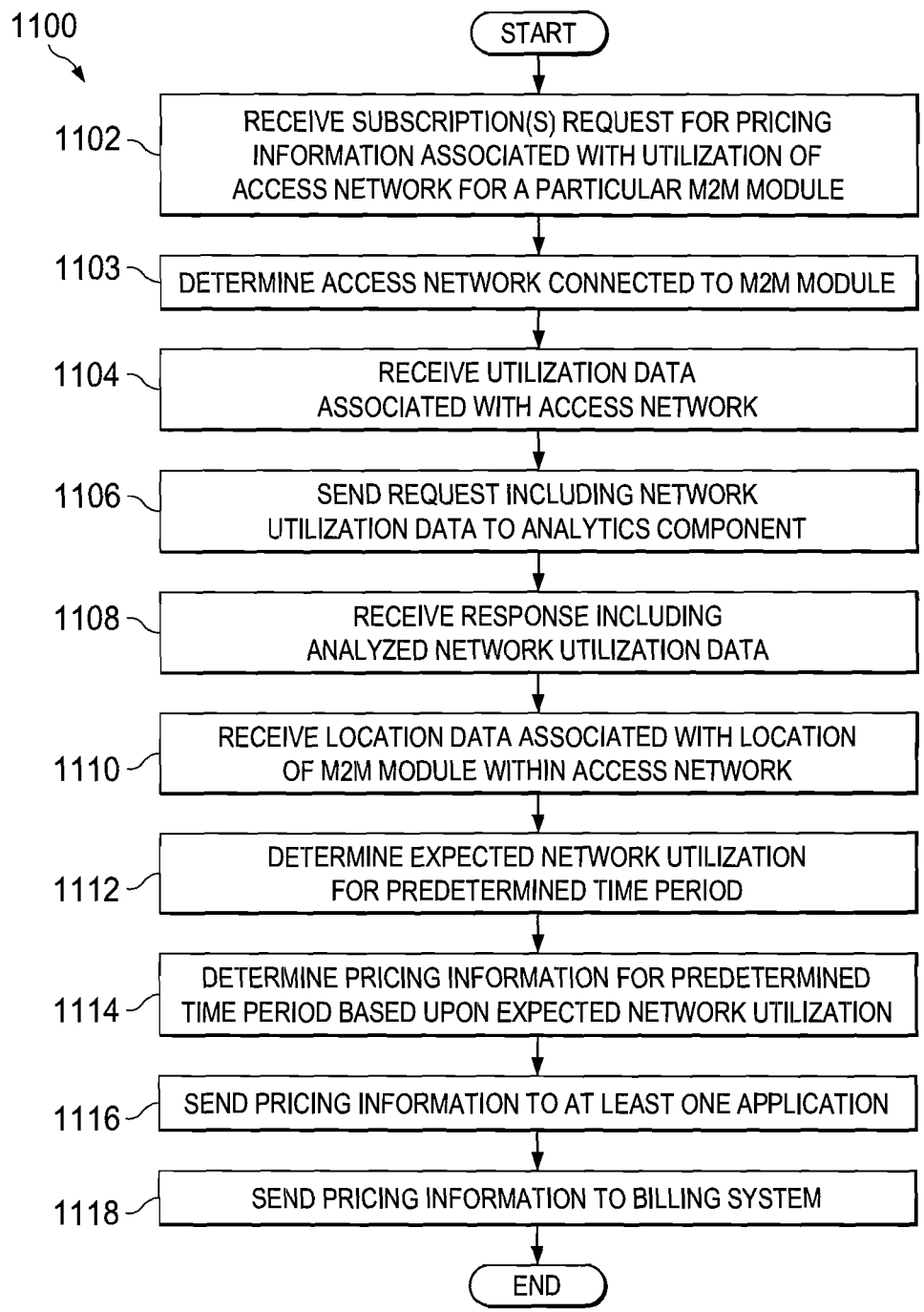
FIG. 11 is a simplified flowchart illustrating an embodiment of operations for orchestrating mobile data networks in a machine-to-machine (M2M) environment.

FIG. 11 is a simplified flowchart 1100 illustrating an embodiment of operations for orchestrating mobile data networks in a machine-to-machine (M2M) environment. In 1102, MINE component 212 receives one or more subscriptions for pricing information associated with utilization of access network(s) 916 for a particular M2M module 920 from one or more applications 912. In one or more embodiments, the subscriptions for pricing information is received from one or more applications 912 of application platform 908. In 1103, MINE component 212 determines the access network that is connected to M2M module 920. In one or more embodiments, MINE component 212 correlates an access network identifier associated with M2M module 920 to an external identifier associated with M2M module. In particular embodiments, the external identifier is used to identify M2M module 920 by application platform 908 associated application 912 and the access network identifier is used to identify M2M module 920 within access network 916. In 1104, MINE component 212 receives network utilization data associated with access network 916. In one or more embodiments, the network utilization data is representative of the bandwidth being utilized within access network 916 by one or more devices. In 1106, MINE component 212 sends a request including the network utilization data to analytics component 116. In one or more embodiments, analytics component 116 analyzes the network utilization data to model expected network utilization at one or more predetermined time periods in the future. In 1108, MINE component 212 receives a response including the analyzed network utilization data.

In 1110, MINE component 212 receives location data associated with a location of M2M module 920 within access network 916. In various embodiments, the location of M2M module 920 may be determined by a base station and/or by the reception of global positioning system (GPS) signals. In 1112, MINE component 212 determines expected network utilization for a predetermined time period based upon one or more of the analyzed network utilization data and location information. In an alternative embodiment, instead of sending the network utilization data to analytics component 116 and receiving analyzed network utilization data, MINE component 212 may be configured to determine the expected network utilization for the predetermined time period based upon one or more of the received network utilization data and location information.

In 1114, MINE component 1114 determines pricing information for the predetermined time period based upon the expected network utilization. In one or more embodiments, the pricing information includes at least one price rate for communication between at least one application 912 and at least one M2M module 920 utilizing access network 916. In various embodiments, the pricing information may include different price rates associated with different service classes. In one or more embodiments, service classes may be based upon a service class associated with one or more of a data type or a particular user. In various embodiments, the pricing information may include a pricing schedule for one or more service classes. In 1116, MINE component 212 sends the pricing information to the at least one application 912. The at least one application 912 may use the pricing information to determine when it may wish to receive data from M2M module 920. In 1118, MINE component 212 sends the pricing information to billing system 918 to enable billing system 918 to charge the appropriate rate to the at least one application 912 during the predetermined time period. The operations then end.

Figure 12:
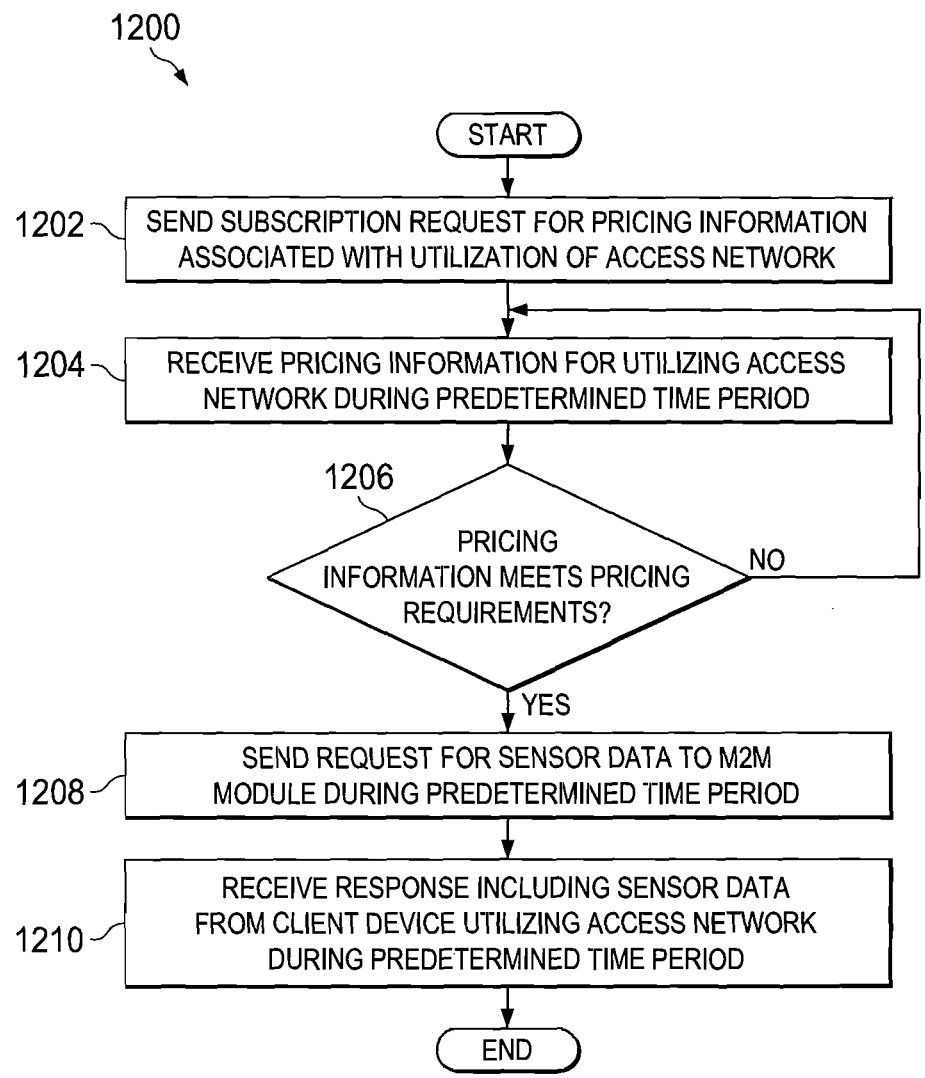
FIG. 12 is a simplified flowchart illustrating an embodiment of operations for utilizing an access network at an advertised price rate for communication between an application and a client device.

FIG. 12 is a simplified flowchart 1200 illustrating an embodiment of operations for utilizing an access network at an advertised price rate for communication between an application and a client device. In 1202, application 912 sends a subscription request for pricing information associated with utilization of access network 916 to receive sensor data from M2M module 920. In 1204, application 912 receives pricing information for utilizing access network 916 during a predetermined time period. In 1206, application 912 determines whether the pricing information meets pricing requirements of application 912. Pricing requirements may include the conditions in which application 912 is willing to pay an advertised rate for receiving sensor data from M2M module 920.

If the pricing information does not meet the pricing requirements of application 912, the operations return to 1204 in which application 912 waits for receiving the next pricing information from MINE component 212. If the pricing information meets the pricing requirements of application 912, the operations continue to 1208. In a particular embodiment, the operations may continue to 1208 if pricing information meeting the pricing requirement of application 912 has not been received within a certain period of time.

In 1208, application 912 sends a request for sensor data to M2M module 920 during the predetermined time period of the advertised pricing information. The request includes a request for M2M module 920 to send sensor data to application 912 utilizing access network 916. In 1210, application 912 receives a response including sensor data from M2M module 920 utilizing access network 916 during the predetermined time period. The operations then end.

In one implementation, server 201 includes software to achieve (or to foster) the operations as outlined herein in this Specification. Note that in one example, each of these elements can have an internal structure (e.g., a processor, a memory element, etc.) to facilitate some of the operations described herein. In other embodiments, the operations may be executed externally to these elements, or included in some other network element to achieve this intended functionality. Alternatively, server 201 may include this software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

Note that in certain example implementations, the orchestration, work flow coordination, and translation functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 8] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor (as shown in FIG. 8) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, server 201 may include software in order to achieve the functions outlined herein. These activities can be facilitated by sub-modules of network, service, subscriber abstraction and orchestration module 202 (where sub-modules can be suitably combined in any appropriate manner, which may be based on particular configuration and/or provisioning needs). Server 201 can include memory elements for storing information to be used in achieving the data abstraction activities, as discussed herein. Additionally, server 201 may include a processor that can execute software or an algorithm to perform the operations, as disclosed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein (e.g., database, tables, trees, cache, etc.) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication systems 100, 200, and 900 (and their teachings) are readily scalable and can accommodate a large number of components, as well as more complicated/sophisticated arrangements and configurations. Accordingly, the examples provided should not limit the scope or inhibit the broad teachings of communication systems 100, 200, and 1000 as potentially applied to a myriad of other architectures.

It is also important to note that the steps in the preceding flow diagrams illustrate only some of the possible signaling scenarios and patterns that may be executed by, or within, communication systems 100, 200, and 900. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems 100, 200, and 900 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols, communication systems 100, 200, and 900 may be applicable to other protocols and arrangements. Moreover, the present disclosure is equally applicable to various technologies, aside from mobile architectures, as these have only been offered for purposes of discussion.

Additionally, although communication systems 100, 200, and 900 have been illustrated with reference to particular elements and operations that facilitate the communication process, these elements and operations may be replaced by any suitable architecture or process that achieves the intended functionality of communication systems 100, 200, and 900.

What is claimed is:

1. A method, comprising:
    receiving network utilization data associated with an access network;
    determining an expected network utilization for a predetermined time period based upon the network utilization data;
    determining pricing information for the predetermined time period based upon the expected network utilization, the pricing information including at least one price rate for communication between at least one application and at least one client device having at least one sensor utilizing the access network; and
    sending the pricing information to the at least one application, wherein the at least one application is configured to determine whether the pricing information meets pricing requirements of the at least one application, send a request for sensor data associated with the at least one sensor to the client device during the predetermined time period when the pricing information meets the pricing requirements, and receive a response including the sensor data from the client device utilizing the access network during the predetermined time period.

2. The method of claim 1, further comprising:
    sending a request including the network utilization data to an analytics component; and
    receiving a response including analyzed network utilization data from the analytics component.

3. The method of claim 2, wherein the determining of the expected network utilization is based upon real-time and historical analyzed network utilization data.

4. The method of claim 1, further comprising receiving location data associated with a location of the client device within the access network, wherein the determining of the expected network utilization is further based upon the location data.

5. The method of claim 1, further comprising receiving a subscription request from the at least one application for pricing information associated with utilization of the access network.

6. The method of claim 1, further comprising sending the pricing information to a billing system.

7. The method of claim 1, wherein the pricing information includes different price rates associated with different service classes.

8. The method of claim 1, wherein the client device includes a machine-to-machine module.

9. The method of claim 1, further comprising correlating an access network identifier associated with the client device to an external identifier associated with the client device.

10. The method of claim 9, wherein the external identifier is used to identify client device by an application platform associated with the at least one application, and the access network identifier is used to identify the client device within the access network.

11. Logic encoded in one or more non-transitory tangible media that includes code for execution and when executed by a processor operable to perform operations comprising:
    receiving network utilization data associated with an access network;
    determining an expected network utilization for a predetermined time period based upon the network utilization data;
    determining pricing information for the predetermined time period based upon the expected network utilization, the pricing information including at least one price rate for communication between at least one application and at least one client device having at least one sensor utilizing the access network; and
    sending the pricing information to the at least one application, wherein the at least one application is configured to determine whether the pricing information meets pricing requirements of the at least one application, send a request for sensor data associated with the at least one sensor to the client device during the predetermined time period when the pricing information meets the pricing requirements, and receive a response including the sensor data from the client device utilizing the access network during the predetermined time period.

12. The logic of claim 11, wherein the operations further include:
sending a request including the network utilization data to an analytics component; and
receiving a response including analyzed network utilization data from the analytics component.

13. The logic of claim 12, wherein the determining of the expect network utilization is based upon the analyzed network utilization data.

14. The logic of claim 11, wherein the operations further include receiving location data associated with a location of the client device within the access network, wherein the determining of the expected network utilization is further based upon the location data.

15. The logic of claim 11, wherein the operations further include receiving a subscription request from the at least one application for pricing information associated with utilization of the access network.

16. The logic of claim 11, wherein the operations further include sending the pricing information to a billing system.

17. The logic of claim 11, wherein the pricing information includes different price rates associated with different service classes.

18. The logic of claim 11, wherein the client device includes a machine-to-machine module.

19. The logic of claim 11, wherein the operations further include correlating an access network identifier associated with the client device to an external identifier associated with the client device.

20. The logic of claim 19, wherein the external identifier is used to identify client device by an application platform associated with the at least one application, and the access network identifier is used to identify the client device within the access network.

21. An apparatus, comprising:
a memory element configured to store data,
a processor operable to execute instructions associated with the data, and
at least one module, the at least one module being configured to:
receive network utilization data associated with an access network;
determine an expected network utilization for a predetermined time period based upon the network utilization data;
determine pricing information for the predetermined time period based upon the expected network utilization, the pricing information including at least one price rate for communication between at least one application and at least one client device having at least one sensor utilizing the access network; and
send the pricing information to the at least one application, wherein the at least one application is configured to determine whether the pricing information meets pricing requirements of the at least one application, send a request for sensor data associated with the at least one sensor to the client device during the predetermined time period when the pricing information meets the pricing requirements, and receive a response including the sensor data from the client device utilizing the access network during the predetermined time period.

22. The apparatus of claim 21, wherein the at least one module is further configured to:
send a request including the network utilization data to an analytics component; and
receive a response including analyzed network utilization data from the analytics component.

23. The apparatus of claim 21, wherein the determining of the expect network utilization is based upon the analyzed network utilization data.

24. The apparatus of claim 21, wherein the at least one module is further configured to receive location data associated with a location of the client device within the access network, wherein the determining of the expected network utilization is further based upon the location data.

25. The apparatus of claim 21, wherein the at least one module is further configured to receive a subscription request from the at least one application for pricing information associated with utilization of the access network.

26. The apparatus of claim 21, wherein the at least one module is further configured to send the pricing information to a billing system.

27. The apparatus of claim 21, wherein the pricing information includes different price rates associated with different service classes.

28. The apparatus of claim 21, wherein the client device includes a machine-to-machine module.

29. The apparatus of claim 21, wherein the at least one module is further configured to correlate an access network identifier associated with the client device to an external identifier associated with the client device.

30. The apparatus of claim 29, wherein the external identifier is used to identify client device by an application platform associated with the at least one application, and the access network identifier is used to identify the client device within the access network.

* * * * *